(12) United States Patent
Hagiwara

(10) Patent No.: US 9,274,325 B2
(45) Date of Patent: Mar. 1, 2016

(54) ZOOM LENS AND IMAGE PICKUP DEVICE PROVIDED WITH THE SAME

(71) Applicant: CANON KABUSHIKI KAISHA, Tokyo (JP)

(72) Inventor: Yasuaki Hagiwara, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 32 days.

(21) Appl. No.: 14/200,088

(22) Filed: Mar. 7, 2014

(65) Prior Publication Data

US 2014/0268364 A1    Sep. 18, 2014

(30) Foreign Application Priority Data

Mar. 13, 2013  (JP) ................................. 2013-050186
Jan. 14, 2014  (JP) ................................. 2014-004581

(51) Int. Cl.
| | | |
|---|---|---|
| *G02B 15/22* | (2006.01) | |
| *G02B 15/14* | (2006.01) | |
| *G02B 13/00* | (2006.01) | |
| *G02B 15/173* | (2006.01) | |

(52) U.S. Cl.
CPC .............. *G02B 15/14* (2013.01); *G02B 13/009* (2013.01); *G02B 15/173* (2013.01); *G02B 15/22* (2013.01)

(58) Field of Classification Search
CPC ........ G02B 15/00; G02B 15/14; G02B 15/16; G02B 15/22; G02B 13/009
USPC .................................. 359/676, 683, 684, 685
See application file for complete search history.

(56) References Cited

U.S. PATENT DOCUMENTS

| | | | |
|---|---|---|---|
| 8,331,035 B2 | 12/2012 | Kon | |
| 8,451,549 B2 | 5/2013 | Yamanaka et al. | |
| 2005/0219708 A1 | 10/2005 | Shibayama et al. | |
| 2008/0218875 A1* | 9/2008 | Kuroda et al. | ................ 359/684 |
| 2008/0297901 A1 | 12/2008 | Mitsuki | |
| 2009/0207501 A1 | 8/2009 | Yokoyama | |
| 2011/0205636 A1* | 8/2011 | Ito | ................................. 359/684 |

(Continued)

FOREIGN PATENT DOCUMENTS

| | | |
|---|---|---|
| CN | 101137921 A | 3/2008 |
| CN | 101515059 A | 8/2009 |

(Continued)

OTHER PUBLICATIONS

European Search Report issued on Oct. 2, 2014, in corresponding European application No. 14158520.8.

(Continued)

*Primary Examiner* — Darryl J Collins
(74) *Attorney, Agent, or Firm* — Carter, DeLuca, Farrell & Schmidt, LLP

(57) ABSTRACT

A zoom lens includes: a first lens unit having a positive refractive power; a second lens unit having a negative refractive power; a third lens unit having a positive refractive power; and a rear unit having two or more lens units, in the order from an object side to an image side, an interval between the adjacent lens units being changed in order to carry out at least one of zooming and focusing, wherein the rear unit includes a focus lens unit that has a negative refractive power and that moves during the focusing, and wherein, when the zoom lens focuses on a specific object distance, the focus lens unit moves integral with the other lens unit during zooming.

25 Claims, 21 Drawing Sheets

(56) References Cited

U.S. PATENT DOCUMENTS

2011/0286105 A1* 11/2011 Yamanaka et al. ............ 359/683
2012/0134031 A1   5/2012 Eguchi et al.

FOREIGN PATENT DOCUMENTS

| | | |
|---|---|---|
| CN | 102162905 A | 8/2011 |
| CN | 102262285 A | 11/2011 |
| EP | 1998204 A1 | 12/2008 |
| JP | 2000-180722 A | 6/2000 |
| JP | 2012-073566 A | 4/2012 |

OTHER PUBLICATIONS

European Partial Search Report issued in corresponding application No. 14158520.8 mailed on Jun. 4, 2014.

European Search Report issued on Oct. 1, 2014, in corresponding European application No. 14158520.8.

Chinese Office Action issued in corresponding application No. CN201410084187.8 on Nov. 26, 2015.

* cited by examiner

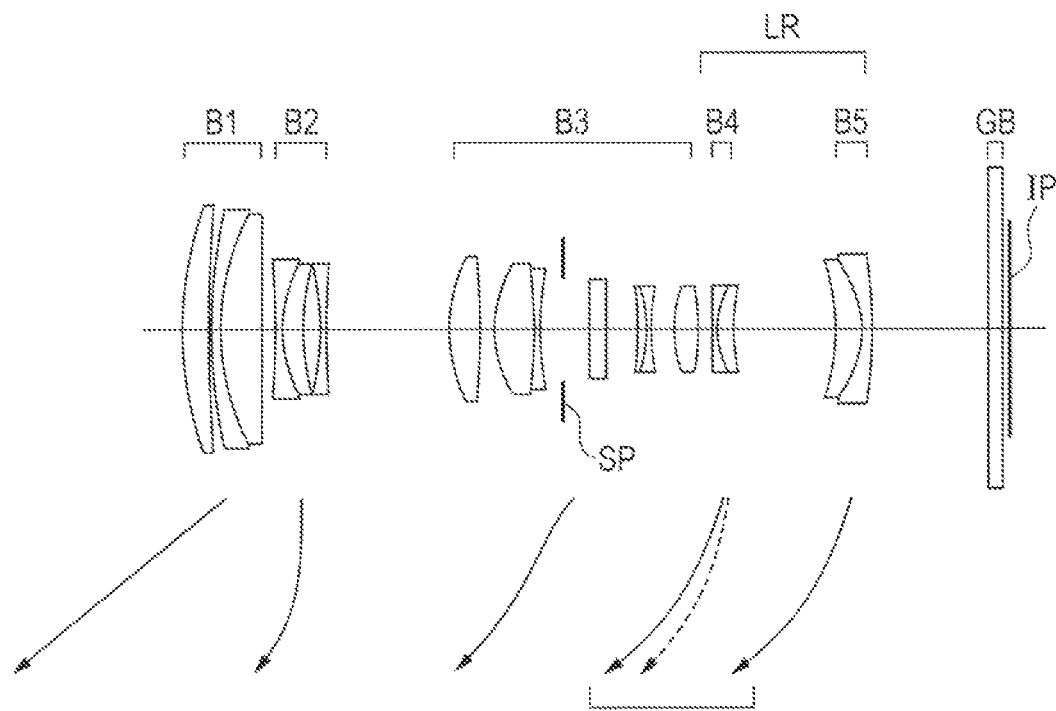
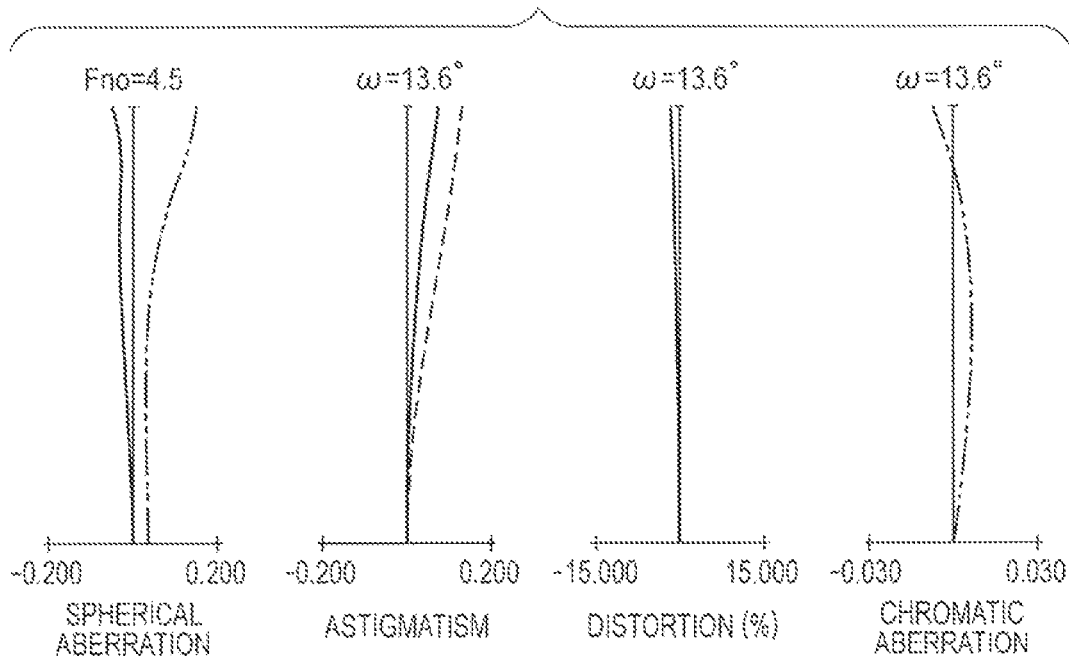

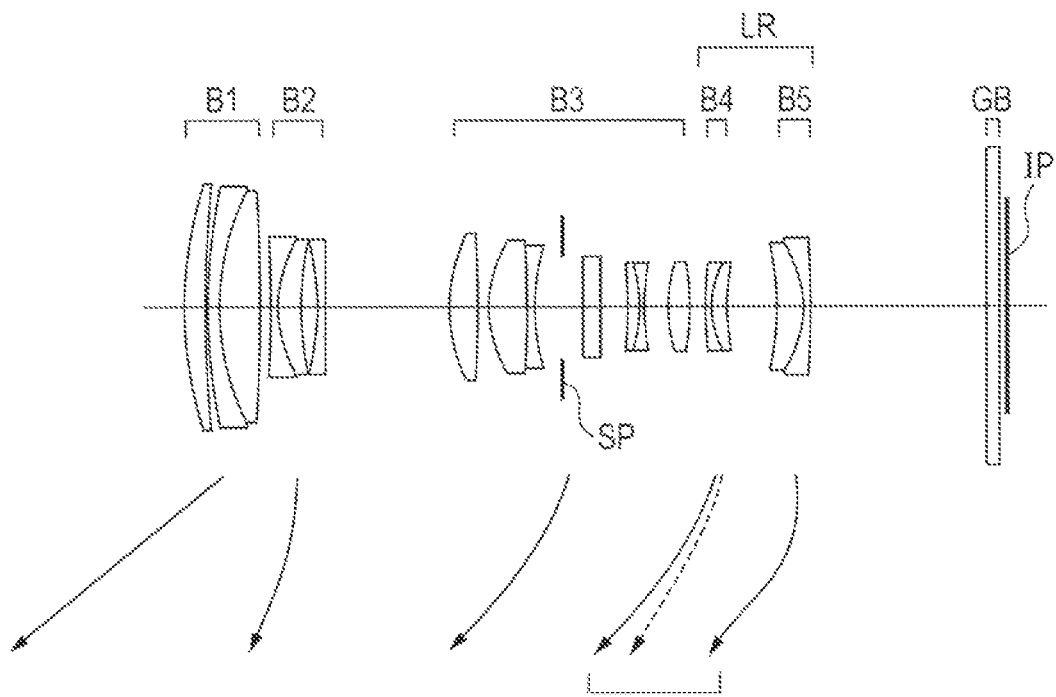
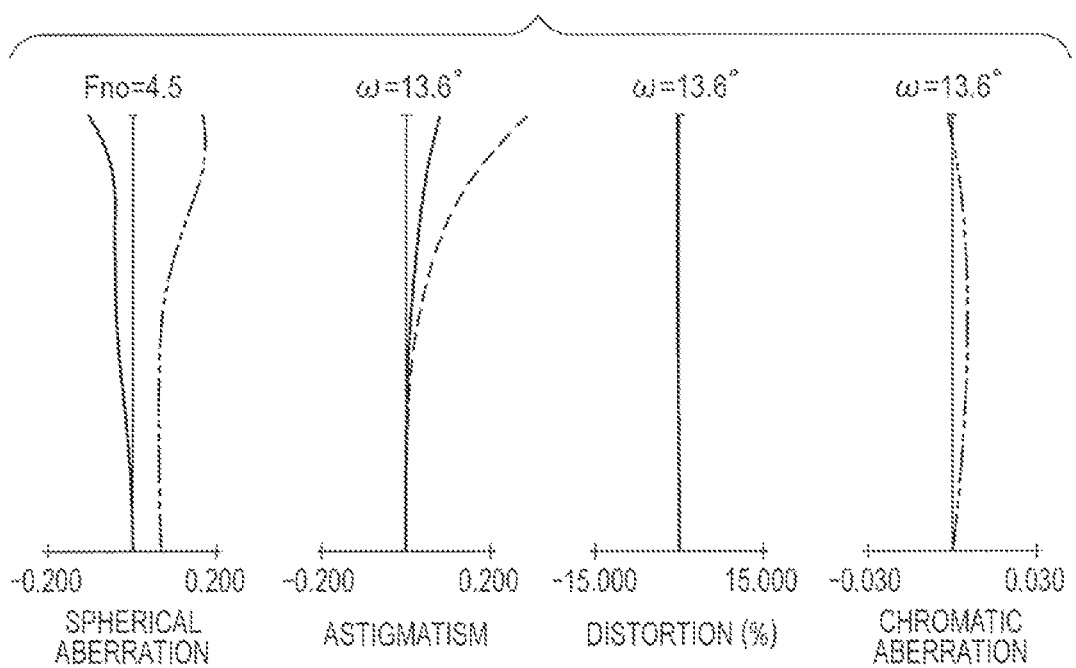

ZOOM LENS AND IMAGE PICKUP DEVICE PROVIDED WITH THE SAME

BACKGROUND OF THE INVENTION

1. Field of the Invention

The present invention relates to a zoom lens, and an image pickup device provided with the same, and is well adaptable to an image pickup device using a solid-state image pickup element, such as a video camera, an electronic still camera, a broadcast camera, or a monitoring camera, or to an image pickup device such as a camera using a silver halide film.

2. Description of the Related Art

A photographing optical system in an image pickup device has been demanded which uses a high-performance zoom lens having a high zoom ratio and which enables a reduction in the size of the system. An image pickup device has also been demanded which has an autofocus (automatic focus detection) mechanism and which is capable of photographing not only a still image but also a moving image. When operating noise from the autofocus mechanism is load during the photographing of a moving image, an image pickup device having the autofocus mechanism might record the operating noise with the moving image. Therefore, an image pickup device having an autofocus mechanism has been demanded which is capable of performing quiet and quick focusing.

U.S. Pat. No. 8,331,035 describes a 4-unit zoom lens including four lens units having respectively a positive refractive power, a negative refractive power, a positive refractive power, and a negative refractive power in the order from an object side to an image side, wherein focusing is carried out by using the fourth lens unit to satisfactorily photograph a still image and a moving image. U.S. Pat. No. 8,451,549 and Japanese Patent Application Laid-Open No. 2000-180722 describe a 5-unit zoom lens including five lens units having respectively a positive refractive power, a negative refractive power, a positive refractive power, a negative refractive power, and a positive refractive power, in the order from, an object side to an image side, wherein focusing is carried out by using the fourth lens unit to satisfactorily photograph a still image and a moving image.

A zoom lens used in an image pickup device is required to be compact (downsized) as a whole, to have a high zoom ratio (high magnification ratio), and to have high optical performance within the entire zoom range. In most zoom lenses, a focus lens unit is moved in synchronization with zooming in order to prevent a focus variation during the zooming. When the focus lens unit and other lens units are controlled by different driving units, it becomes difficult to move the focus lens unit completely in synchronization with the zooming due to an electrical control delay or speed limit of motors, for example, whereby defocusing occurs upon the zooming.

In this case, the defocusing upon the zooming can be reduced by quickly operating the focus lens unit. However, this operation increases the operating noise. Therefore, use of a focusing system and zooming system capable of easily preventing the defocusing upon the zooming is required. When a lens unit moving with the zooming is used as a focus lens unit, the focus lens unit has to be provided with two types of moving mechanisms, which are a moving mechanism for zooming and a moving mechanism for focusing. It is also necessary to move the focus lens unit very fast.

When the focus lens unit is provided with two types of moving mechanisms, the whole system becomes large in size, and operating noise during focusing increases. Accordingly, a zoom lens used in an image pickup device has to have a focusing mechanism that can easily perform quiet and quick focusing and that can easily prevent defocusing during zooming. In particular, since the operating noise during focusing is mainly determined by the weight of a focus lens unit, it is important to appropriately set an arrangement, size, and weight of the focus lens unit in an optical path.

SUMMARY OF THE INVENTION

A zoom lens according to the present invention includes: a first lens unit having a positive refractive power; a second lens unit having a negative refractive power; a third lens unit having a positive refractive power; and a rear unit having two or more lens units, in the order from an object side to an image side, an interval between the adjacent lens units being changed in order to carry out at lease one or zooming and focusing, wherein the rear unit includes a focus lens unit that has a negative refractive power and that moves during the focusing, and wherein, when the zoom lens focuses on a specific object distance, the focus lens unit moves integral with the other lens unit during zooming.

A zoom lens according to the present invention includes: a first lens unit having a positive refractive power; a second lens unit having a negative refractive power; a third lens unit having a positive refractive power; a fourth lens unit having a negative refractive power, and a fifth lens unit having a negative or positive refractive power, in the order from an object side to an image side, wherein at least the first lens unit, the third lens unit, the fourth lens unit, and the fifth lens unit move during zooming, and the fourth lens unit moves during focusing, the zoom lens satisfying conditional expressions of:

$$0.55 < f2/f4 < 0.8$$

$$0.7 < T1/ft < 0.8$$

when a focal length of the second lens unit is defined as f2, a focal length of the fourth lens unit is defined as f4, a focal length of the entire zoom lens on a telephoto end is defined as ft, and a distance on an optical axis from the surface of the lens closest to the object side on the telephoto end to an image plane is defined as T1.

Further features of the present invention will become apparent from the following description of exemplary embodiments with reference to the attached drawings.

BRIEF DESCRIPTION OF THE DRAWINGS

FIG. 1 is a sectional view of a lens according to an embodiment 1 of the present invention.

FIG. 2A is an aberration diagram of the lens on a wide angle end according to the embodiment 1 of the present invention.

FIG. 5 is a sectional view of a lens according to an embodiment 3 of the present invention.

FIG. 6A is an aberration diagram of the lens on a wide angle end according to the embodiment 3 of the present invention.

DESCRIPTION OF THE EMBODIMENTS

Preferred embodiments of the present invention will now be described in detail in accordance with the accompanying drawings. A zoom lens according to each of embodiments of the present invention includes, in the order from an object side to an image side, a first lens unit having a positive refractive power (optical power=reciprocal of a focal length), a second lens unit having a negative refractive power, a third lens unit having a positive refractive power, and a rear unit including two or more lens units. An interval between the adjacent lens units is changed in order to carry out at least either one of zooming and focusing. The rear unit includes a focus lens unit that moves during the focusing. The focus lens unit moves integral with the other lens units during the zooming for focusing on a specified object distance.

Figure 2B:
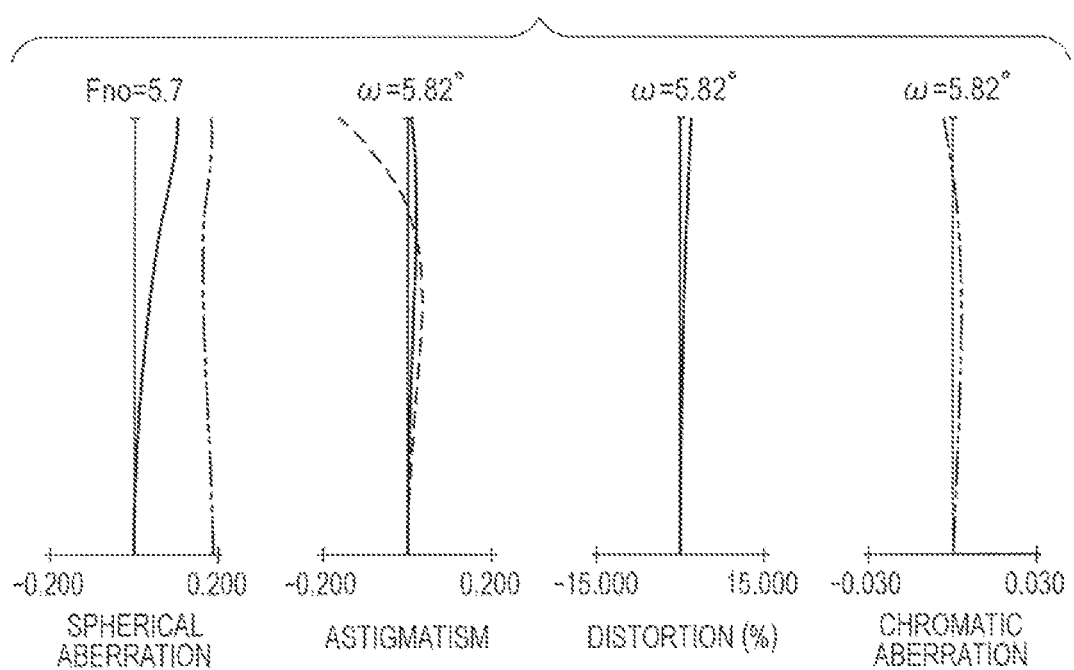
FIG. 2B is an aberration diagram of the lens on a middle zooming position according to the embodiment 1 of the present invention.
Figure 2C:
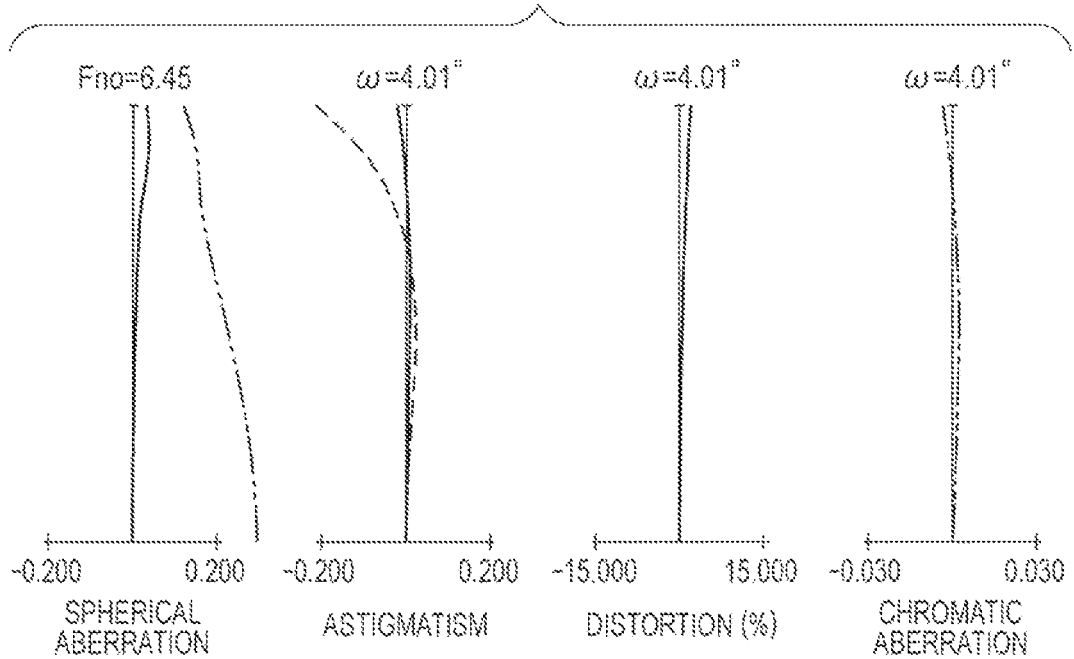
FIG. 2C is an aberration diagram of the lens on a telephoto end according to the embodiment 1 of the present invention.

FIG. 1 is a sectional view of a zoom lens on a wide angle end (short focal length end) according to the embodiment 1 of the present invention. FIGS. 2A, 2B, and 2C are aberration diagrams of the zoom lens at a wide angle end, a middle zooming position, and a telephoto end (long focal length end), respectively, according to the embodiment 1. The embodiment 1 illustrates the zoom lens with a zoom ratio of 3.45 and a numerical aperture of about 4.56 to 6.45.

Figure 3:
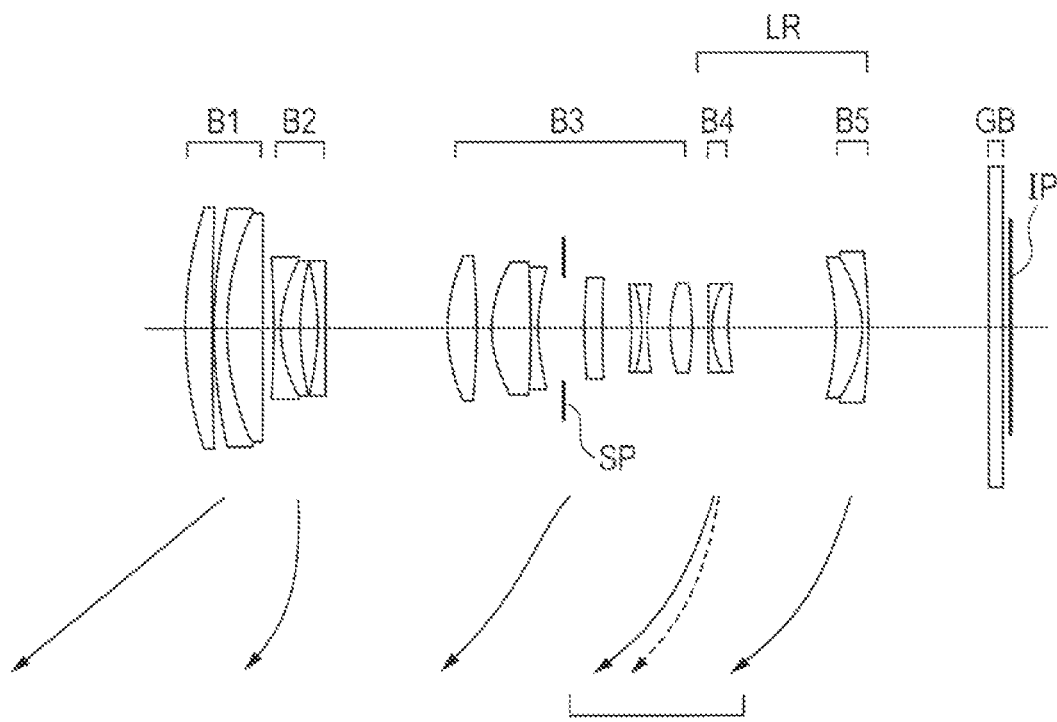
FIG. 3 is a sectional view of a lens according to an embodiment 2 of the present invention.
Figure 4A:
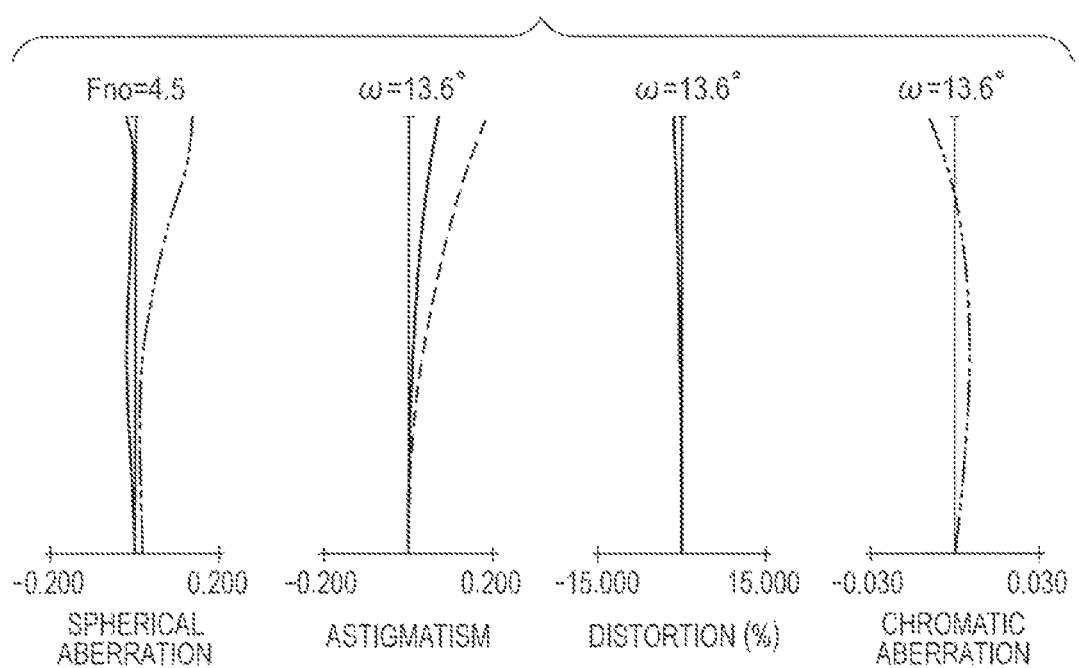
FIG. 4A is an aberration diagram of the lens on a wide angle end according to the embodiment 2 of the present invention.
Figure 4B:
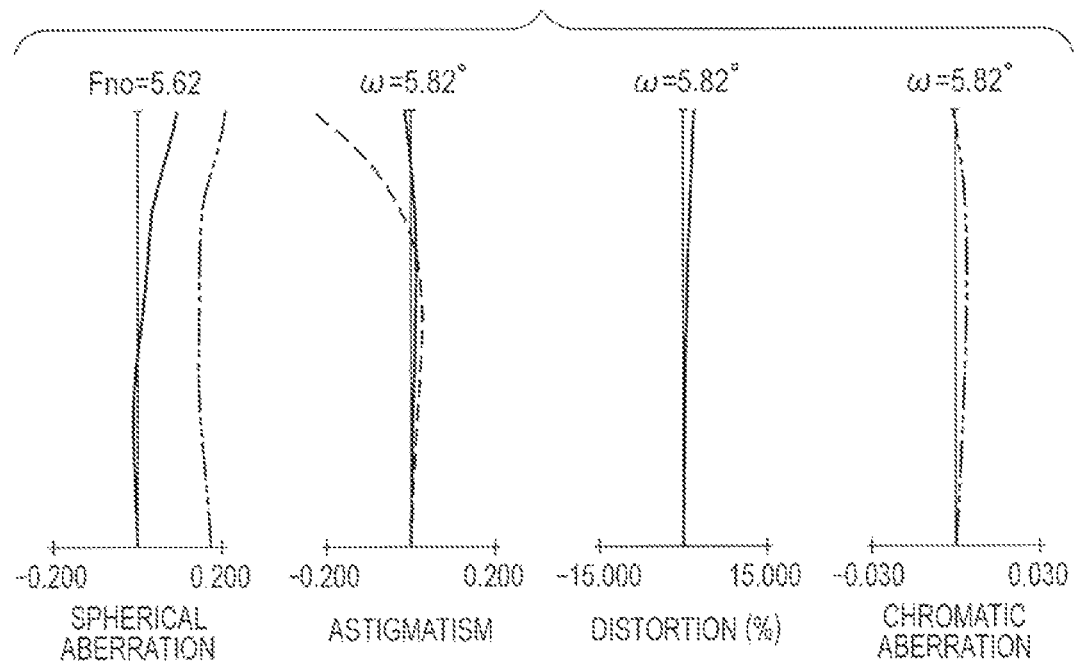
FIG. 4B is an aberration diagram of the lens on a middle zooming position according to the embodiment 2 of the present invention.
Figure 4C:
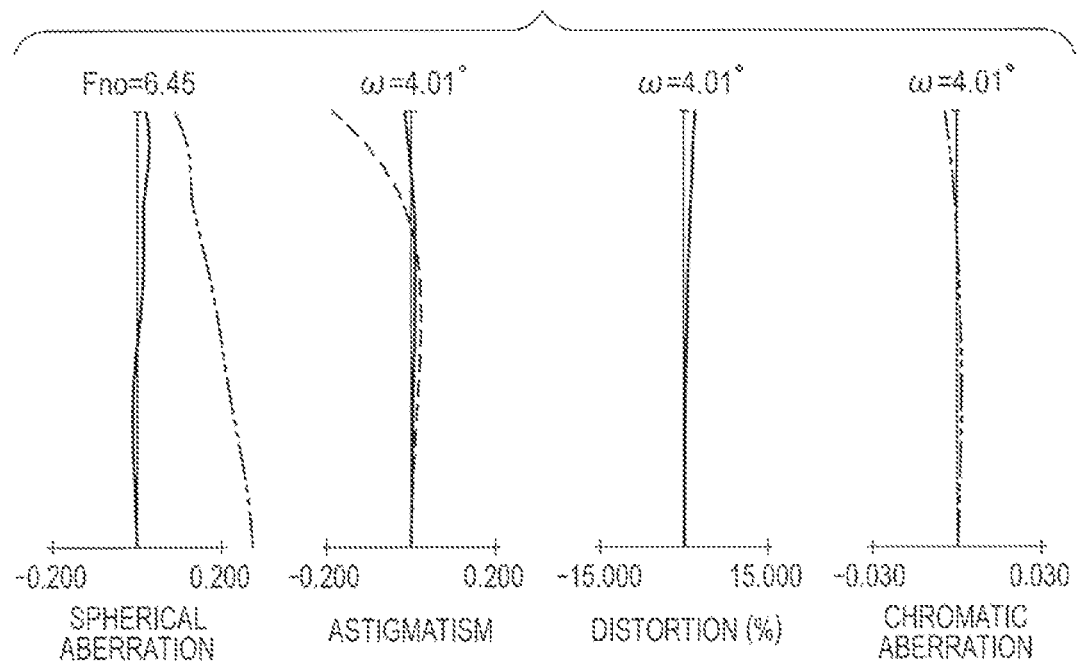
FIG. 4C is an aberration diagram of the lens on a telephoto end according no the embodiment 2 of the present invention.

FIG. 3 is a sectional view of a zoom lens on a wide angle end according to an embodiment 2 of the present invention. FIGS. 4A, 4B, and 4C are aberration diagrams of the zoom lens at a wide angle end, a middle zooming position, and a telephoto end, respectively, according to the embodiment 2. The embodiment 2 illustrates the zoom lens with a zoom ratio of 3.45 and a numerical aperture of about 4.50 to 6.45.

Figure 6B:
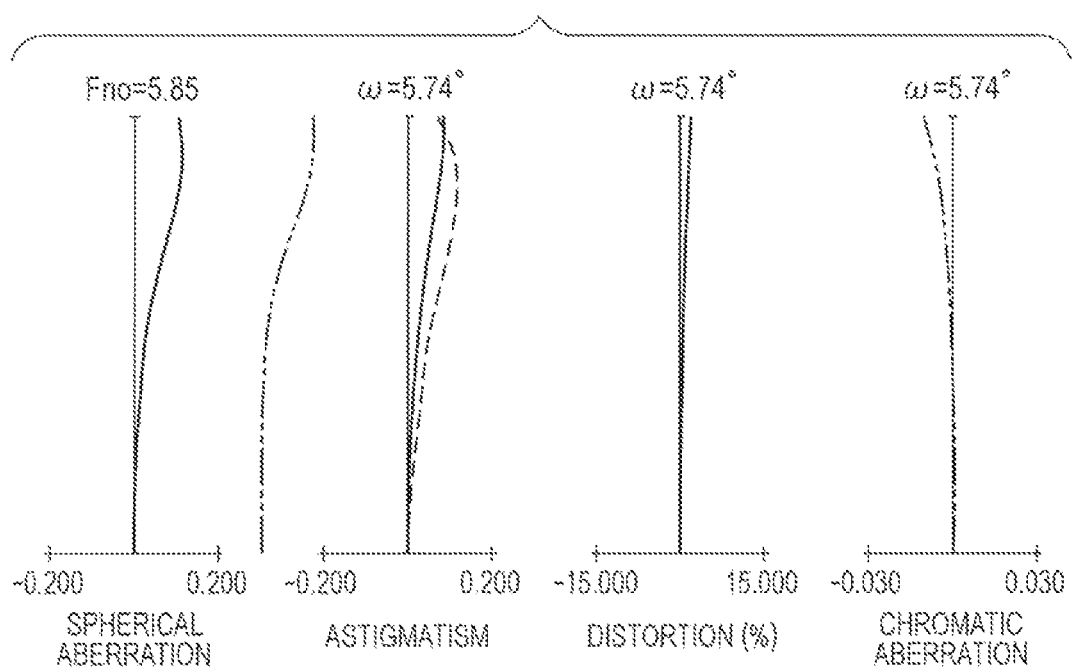
FIG. 6B is an aberration diagram of the lens on a middle zooming position according to the embodiment 3 of the present invention.
Figure 6C:
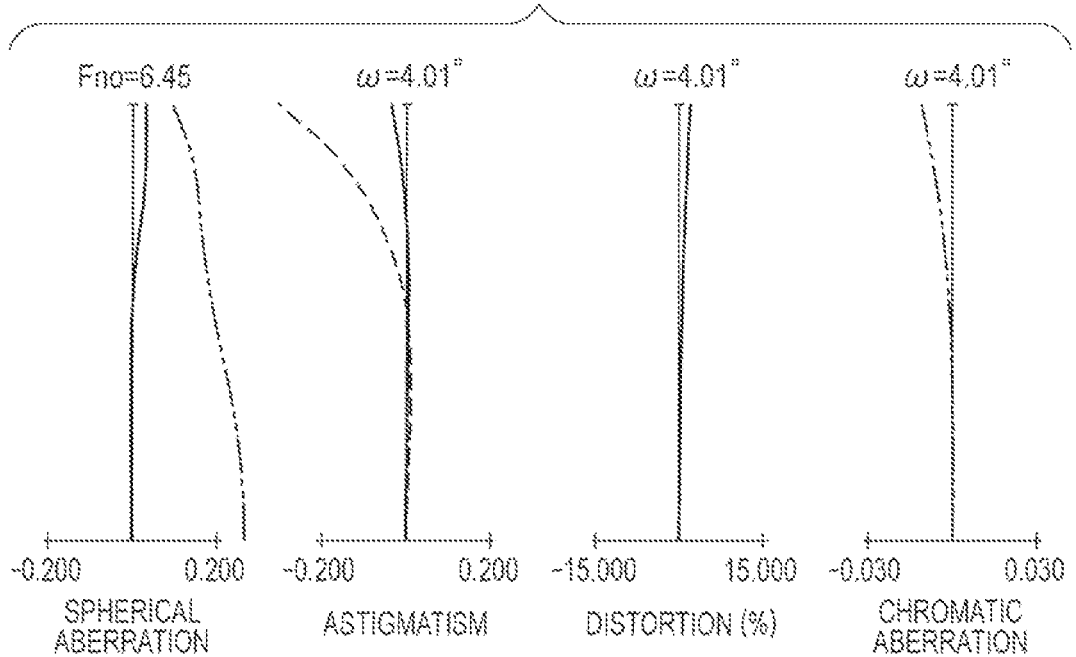
FIG. 6C is an aberration diagram of the lens on a telephoto end according to the embodiment 3 of the present invention.

FIG. 5 is a sectional view of a zoom lens on a wide angle end according to an embodiment 3 of the present invention. FIGS. 6A, 6B, and 6C are aberration diagrams of the zoom lens at a wide angle end, a middle zooming position, and a telephoto end, respectively, according to the embodiment 3. The embodiment 3 illustrates the zoom lens with a zoom ratio of 3.45 and a numerical aperture of about 4.50 to 6.45.

Figure 7:
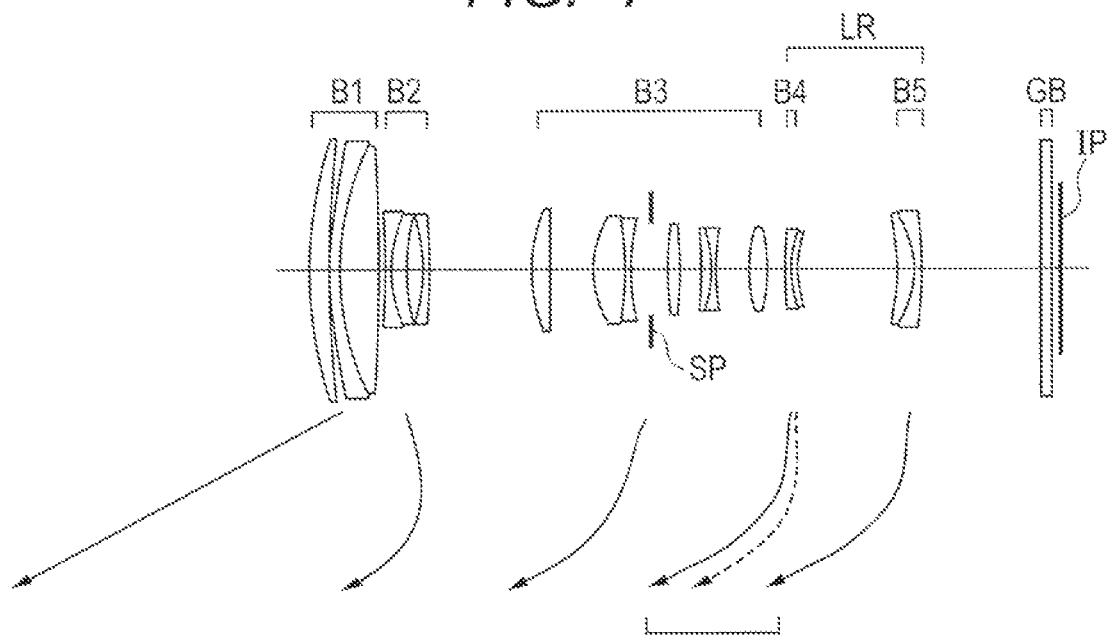
FIG. 7 is a sectional view of a lens according to an embodiment 4 of the present invention.
Figure 8A:
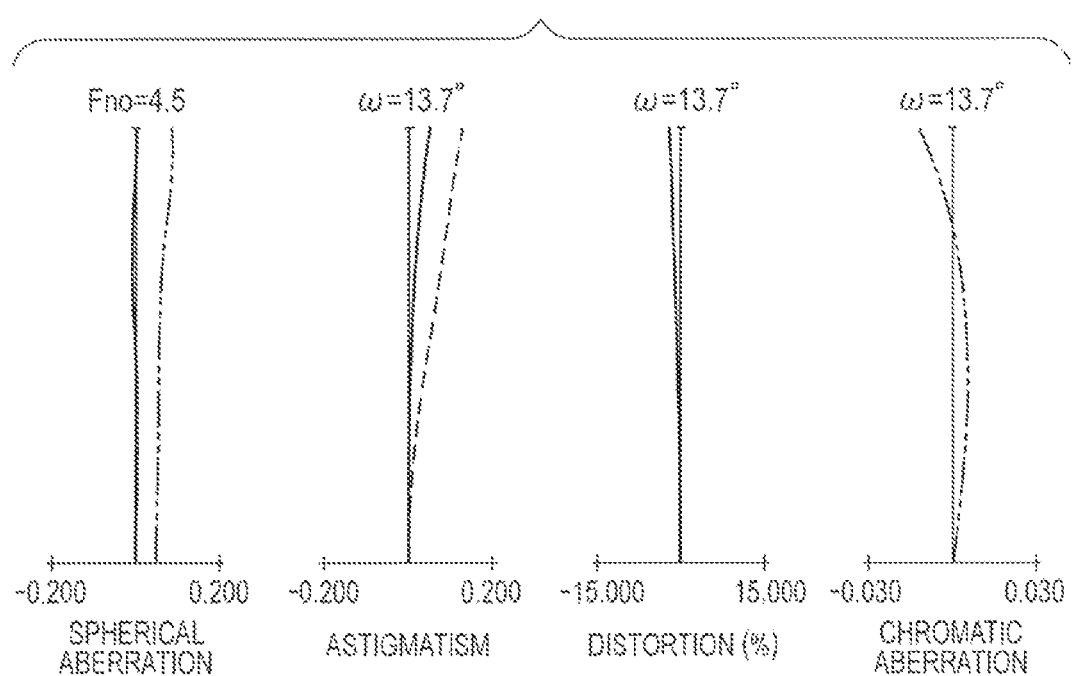
FIG. 8A is an aberration diagram of the lens on a wide angle end according to the embodiment 4 of the present invention.
Figure 8B:
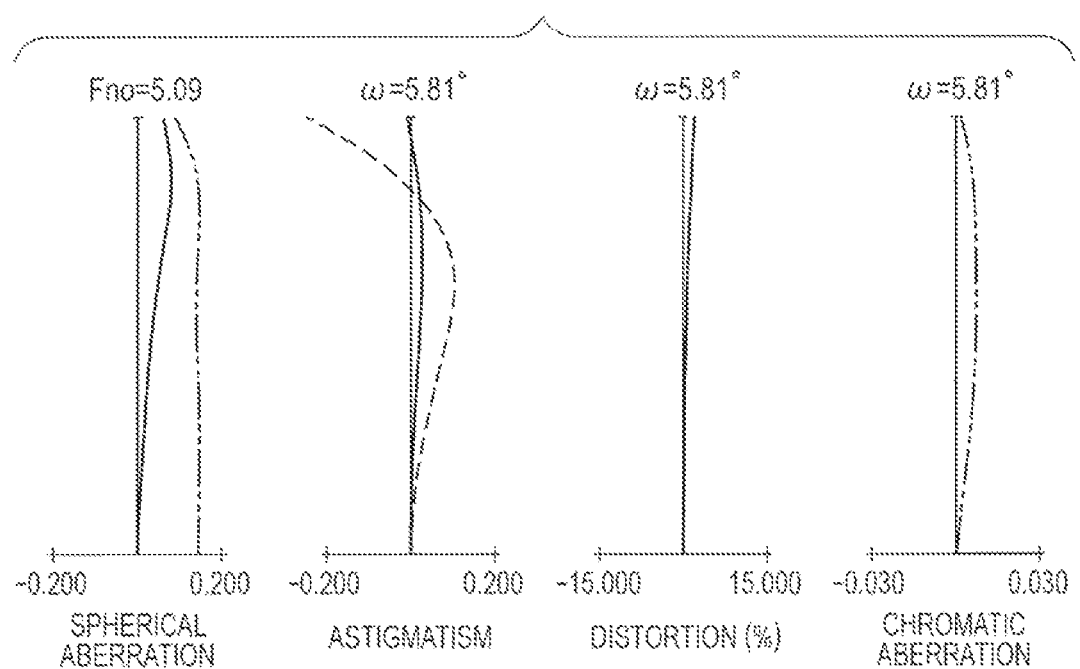
FIG. 8B is an aberration diagram of the lens on a middle zooming position according to the embodiment 4 of the present invention.
Figure 8C:
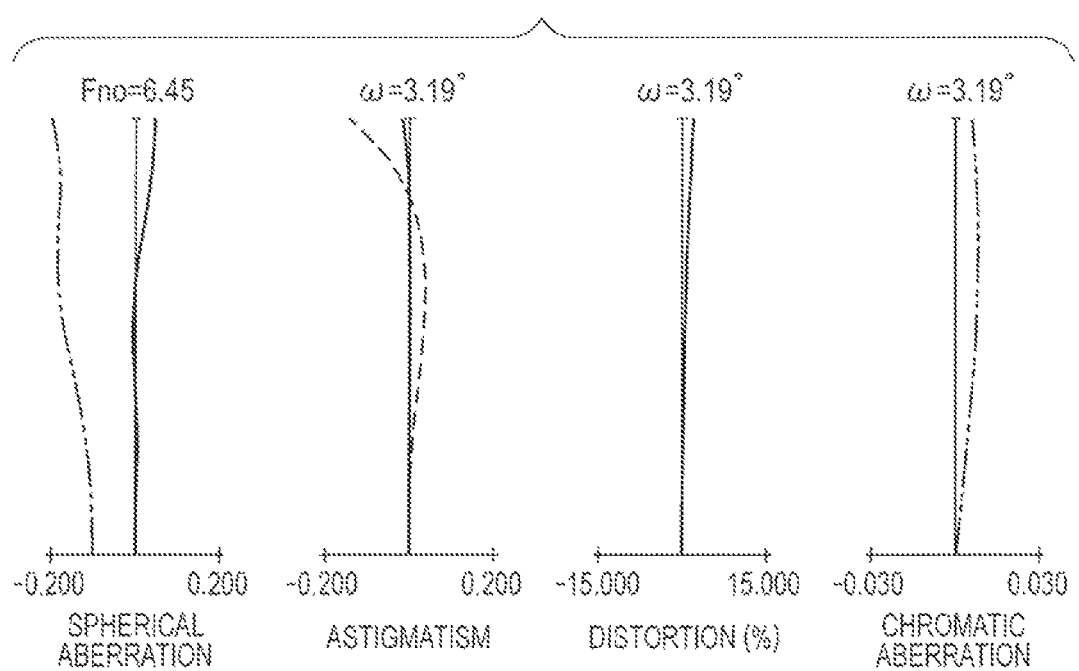
FIG. 8C is an aberration diagram of the lens on a telephoto end according to the embodiment 4 of the present invention.

FIG. 7 is a sectional view of a zoom lens on a wide angle end according to an embodiment 4 of the present invention. FIGS. 8A, 8B, and 8C are aberration diagrams of the zoom lens at a wide angle end, a middle zooming position, and a telephoto end, respectively, according to the embodiment 4. The embodiment 4 illustrates the zoom lens with a zoom ratio of 4.36 and a numerical aperture of about 4.50 to 6.45.

Figure 9:
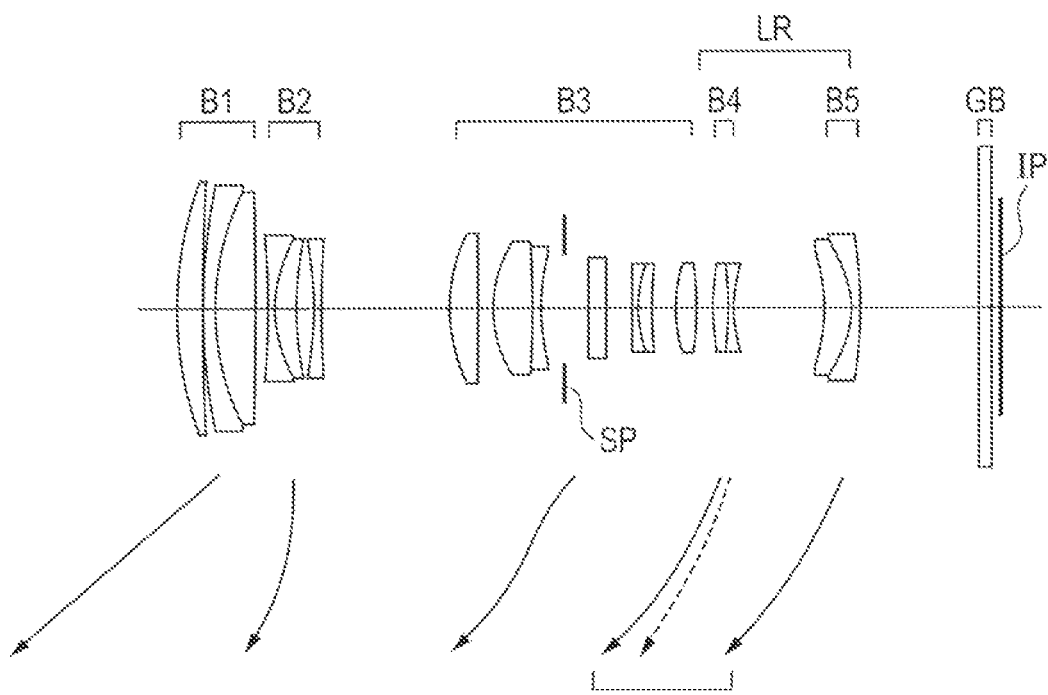
FIG. 9 is a sectional view of a lens according to an embodiment 5 of the present invention.
Figure 10A:
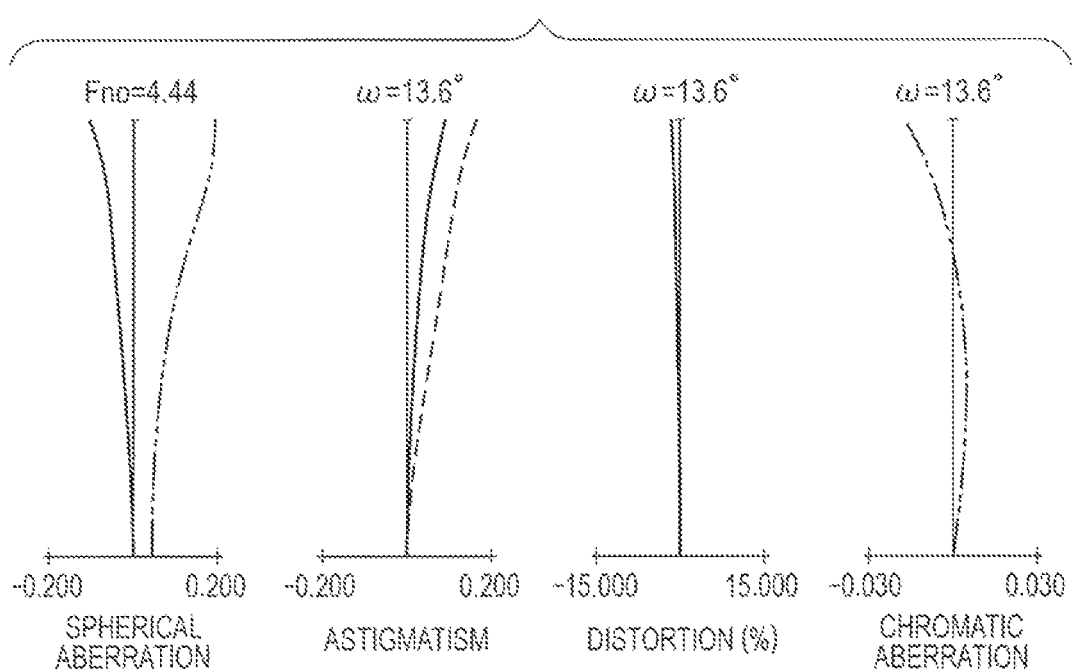
FIG. 10A is an aberration diagram or the lens on a wide angle end according to the embodiment 5 of the present invention.
Figure 10B:
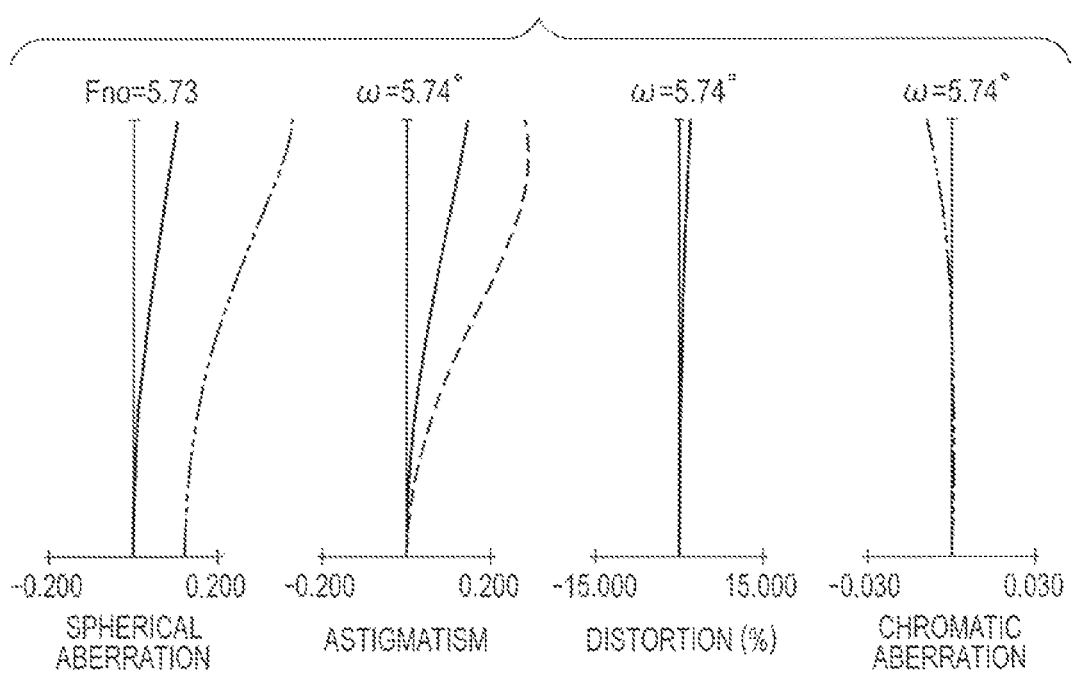
FIG. 10B is an aberration diagram of the lens on a middle zooming position according to the embodiment 5 of the present invention.
Figure 10C:
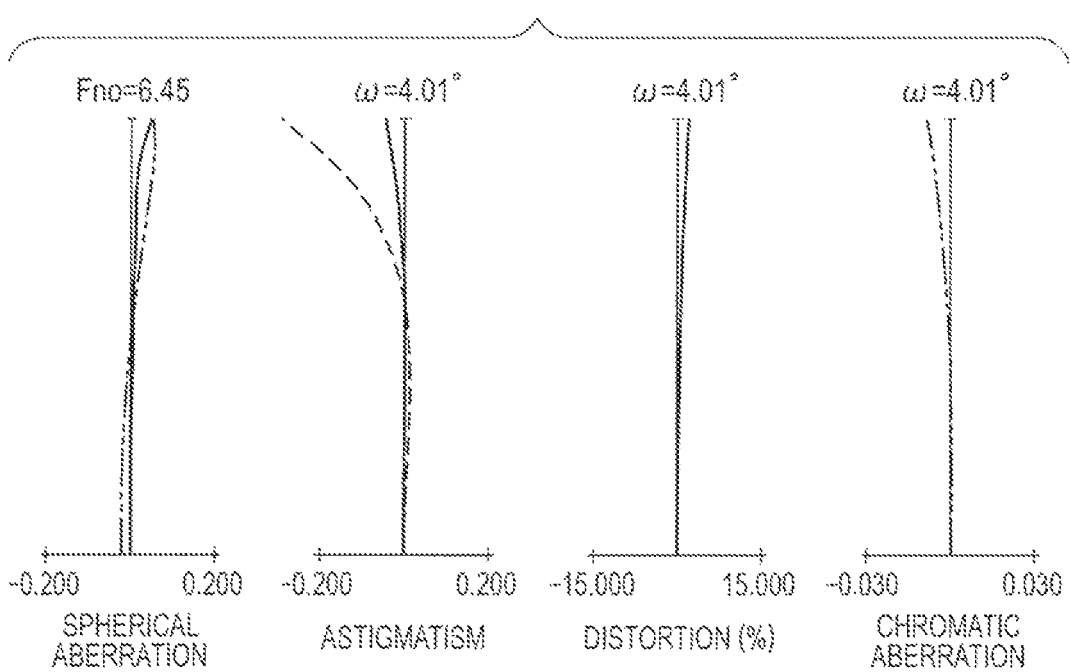
FIG. 10C is an aberration diagram of the lens on a telephoto end according to the embodiment 5 of the present invention.

FIG. 9 is a sectional view of a zoom lens on a wide angle end according to an embodiment 5 of the present invention. FIGS. 10A, 10B, and 10C are aberration diagrams of the zoom lens at a wide angle end, a middle zooming position, and a telephoto end, respectively, according to the embodiment 5. The embodiment 5 illustrates the zoom lens with a zoom ratio of 3.45 and a numerical aperture of about 4.44 to 6.45.

Figure 11:
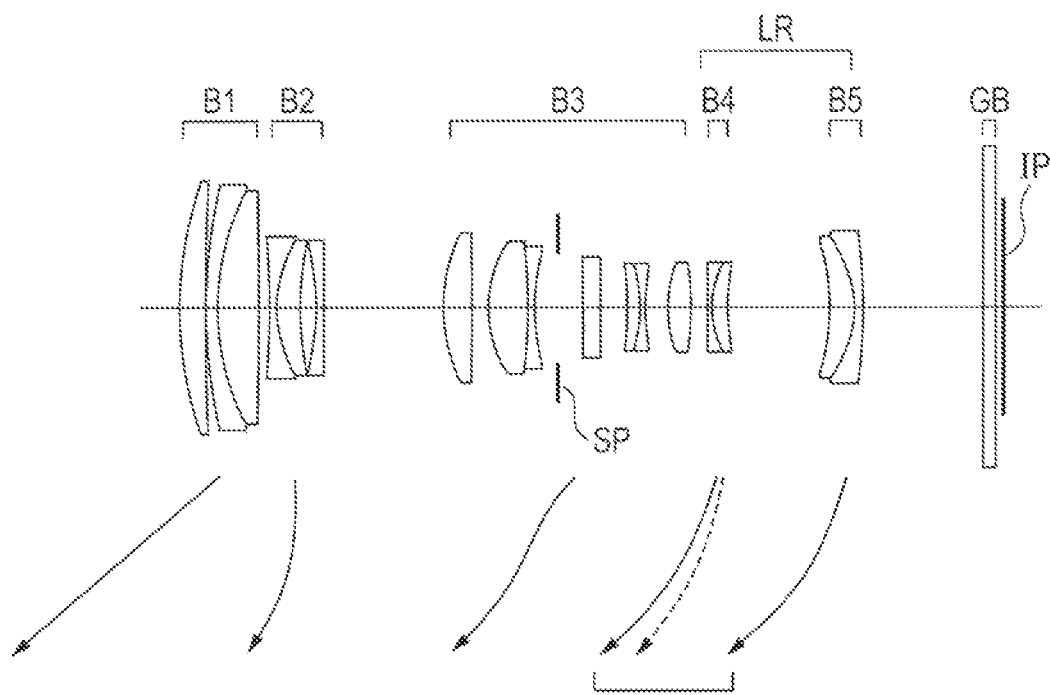
FIG. 11 is a sectional view of a lens according to an embodiment 6 of the present invention.
Figure 12A:
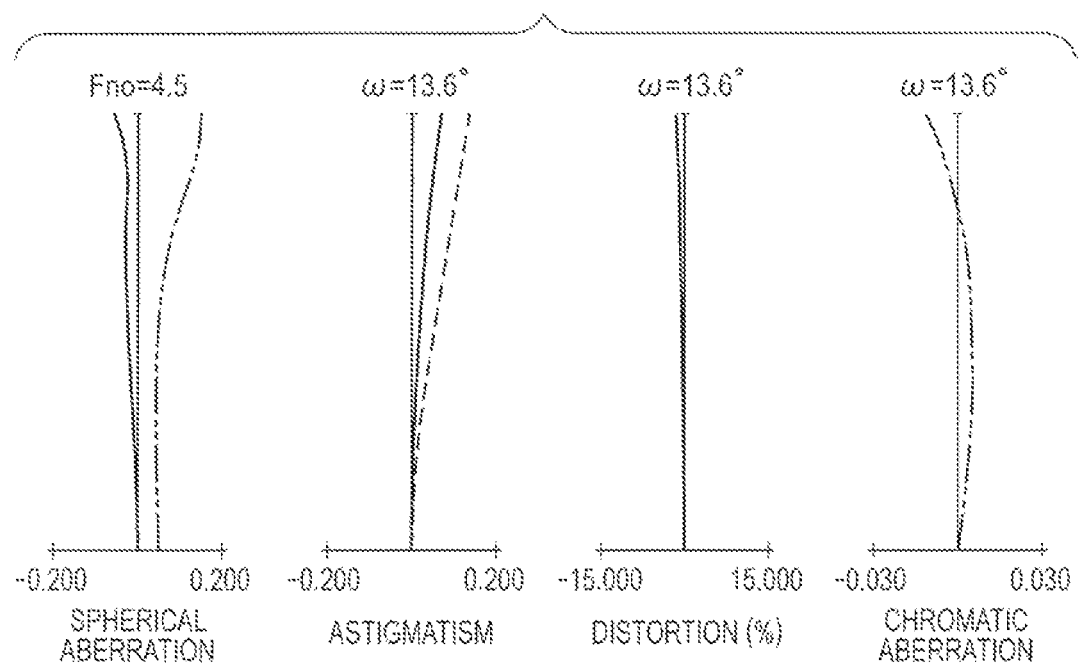
FIG. 12A is an aberration diagram of the lens on a wide angle end according to the embodiment 6 of the present invention.
Figure 12B:
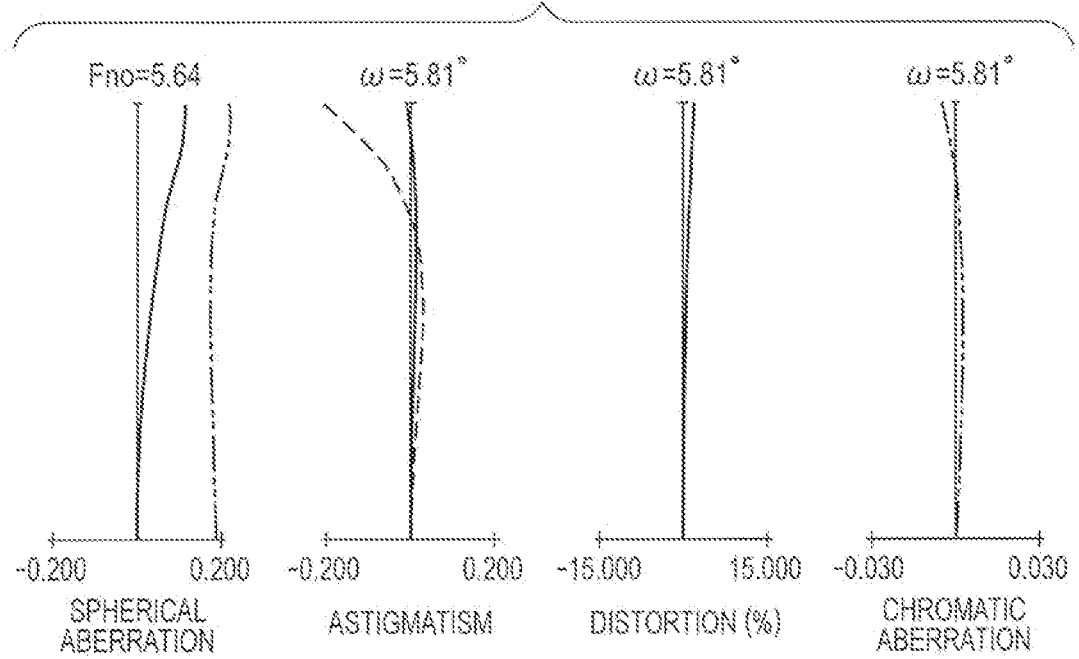
FIG. 12B is an aberration diagram of the lens on a middle zooming position according to the embodiment 6 of the present invention.
Figure 12C:
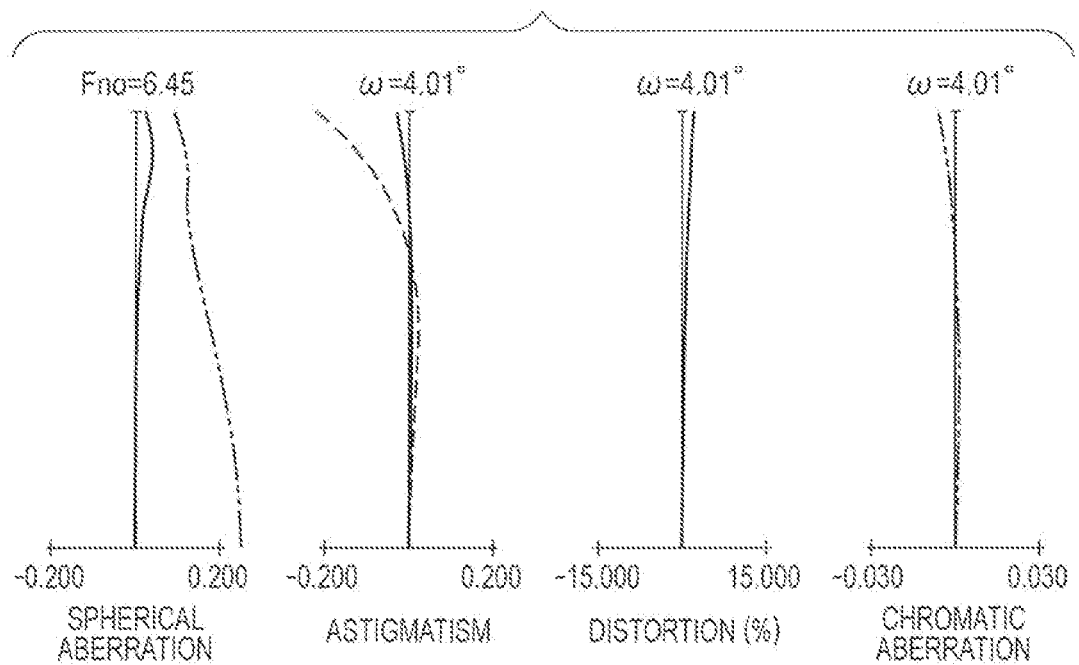
FIG. 12C is on aberration diagram of the lens on a telephoto end according to the embodiment 6 of the present invention.

FIG. 11 is a sectional view of a zoom lens on a wide angle end according to an embodiment 6 of the present invention. FIGS. 12A, 12B, and 12C are aberration diagrams of the zoom lens at a wide angle end, a middle zooming position, and a telephoto end, respectively, according to the embodiment 6. The embodiment 6 illustrates the zoom lens with a zoom ratio of 3.45 and a numerical aperture of about 4.50 to 6.45.

Figure 13:
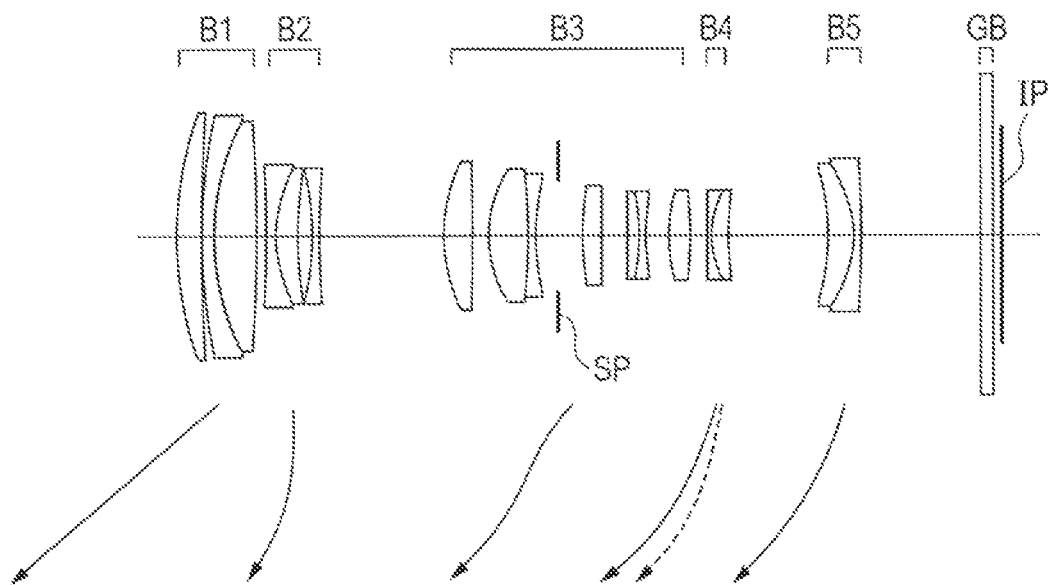
FIG. 13 is a sectional view of a lens according to an embodiment 7 of the present invention.
Figure 14A:
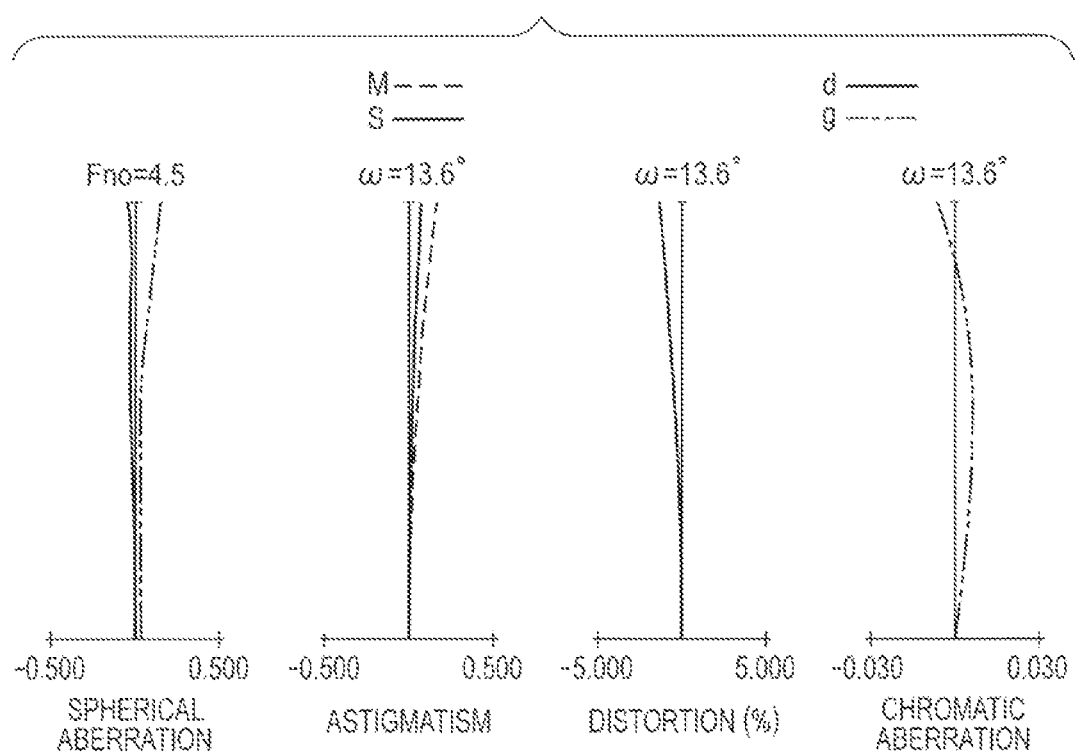
FIG. 14A is an aberration diagram of the lens on a wide angle end according to the embodiment 7 of the present invention.
Figure 14B:
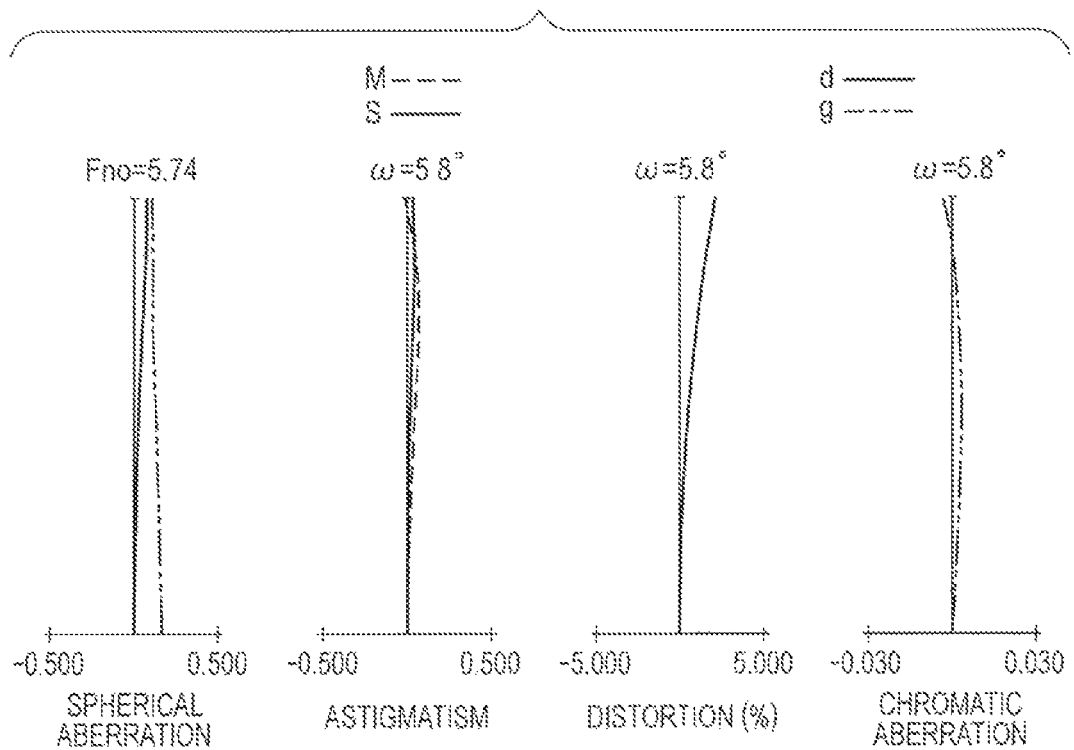
FIG. 14B is an aberration diagram of the lens on a middle zooming position according to the embodiment 7 of the present invention.
Figure 14C:
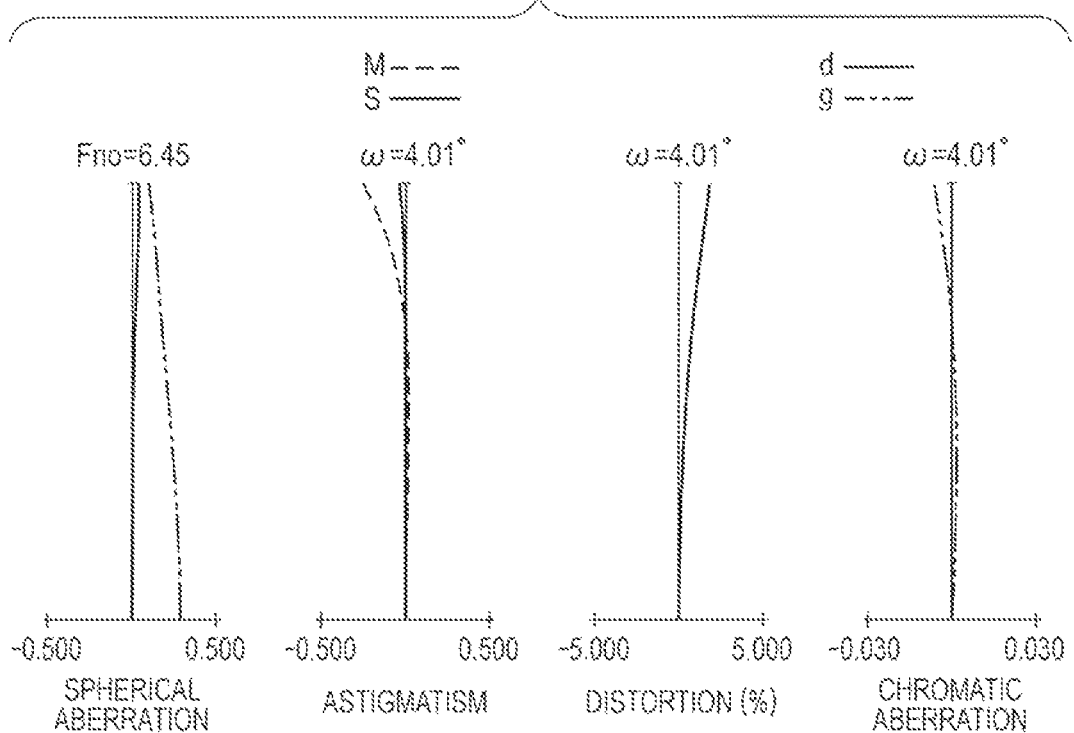
FIG. 14C is an aberration diagram of the lens on a telephoto end according to the embodiment 7 of the present invention.

FIG. 13 is a sectional view of a zoom leas on a wide angle end according an embodiment 7 of the present invention. FIGS. 14A, 14B, and 14C are aberration diagrams of the zoom lens at a wide angle end, a middle zooming position, and a telephoto end, respectively, according to the embodiment 7. The embodiment 7 illustrates the zoom lens with a zoom ratio of 3.45 and a numerical aperture of about 4.50 to 6.45.

Figure 15:
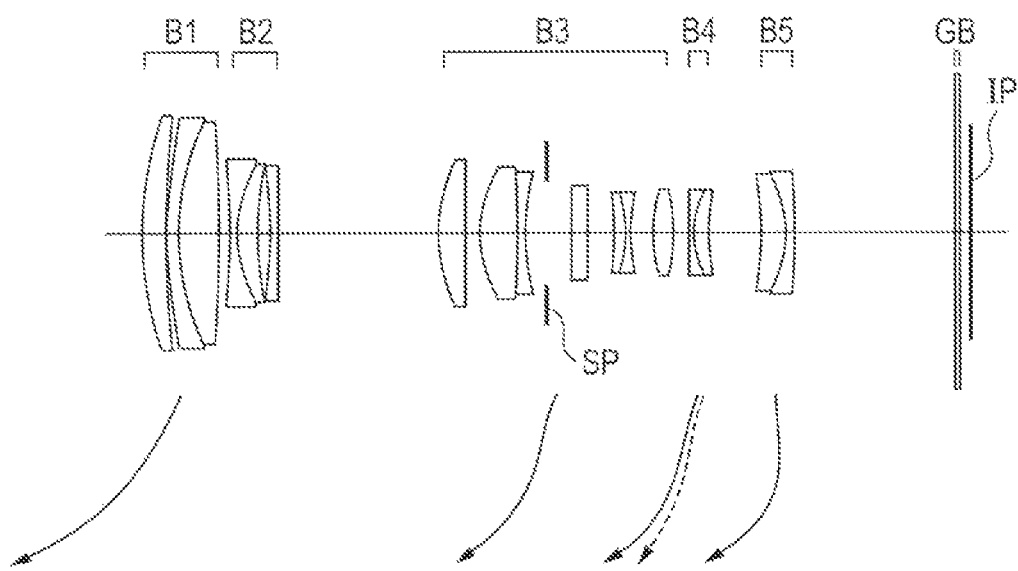
FIG. 15 is a sectional view of a lens according to an embodiment 8 of the present invention.
Figure 16A:
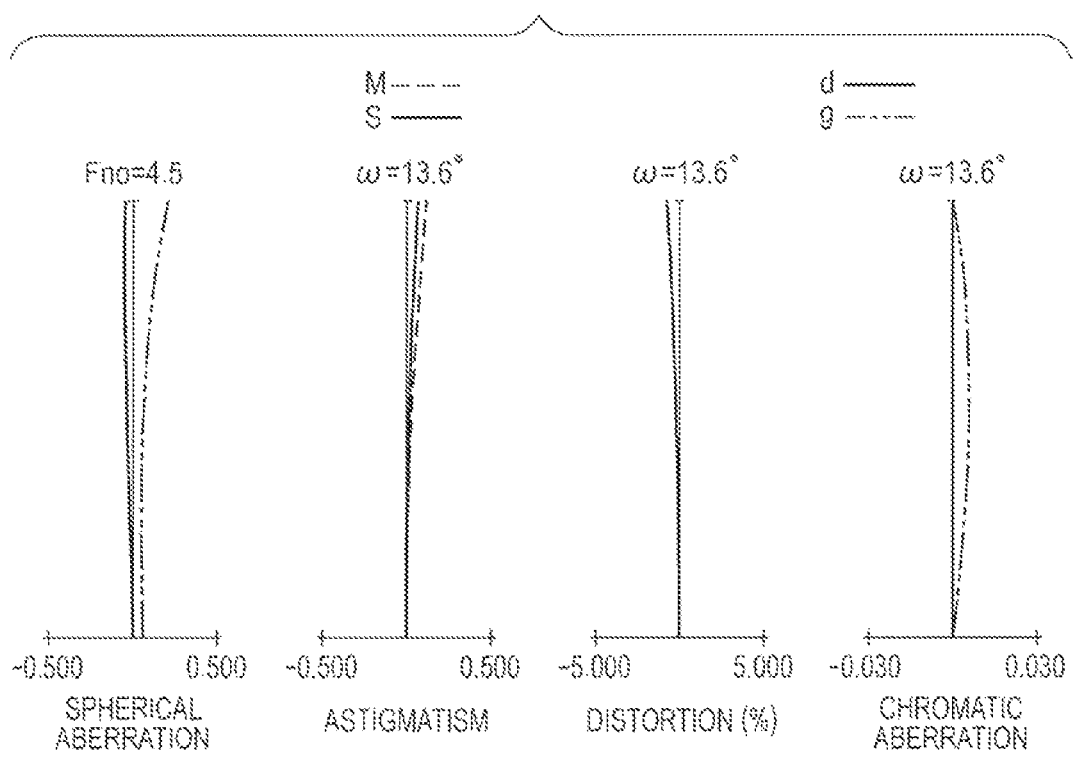
FIG. 16A is an aberration diagram of the lens on a wide angle end according to the embodiment 8 of the present invention.
Figure 16B:
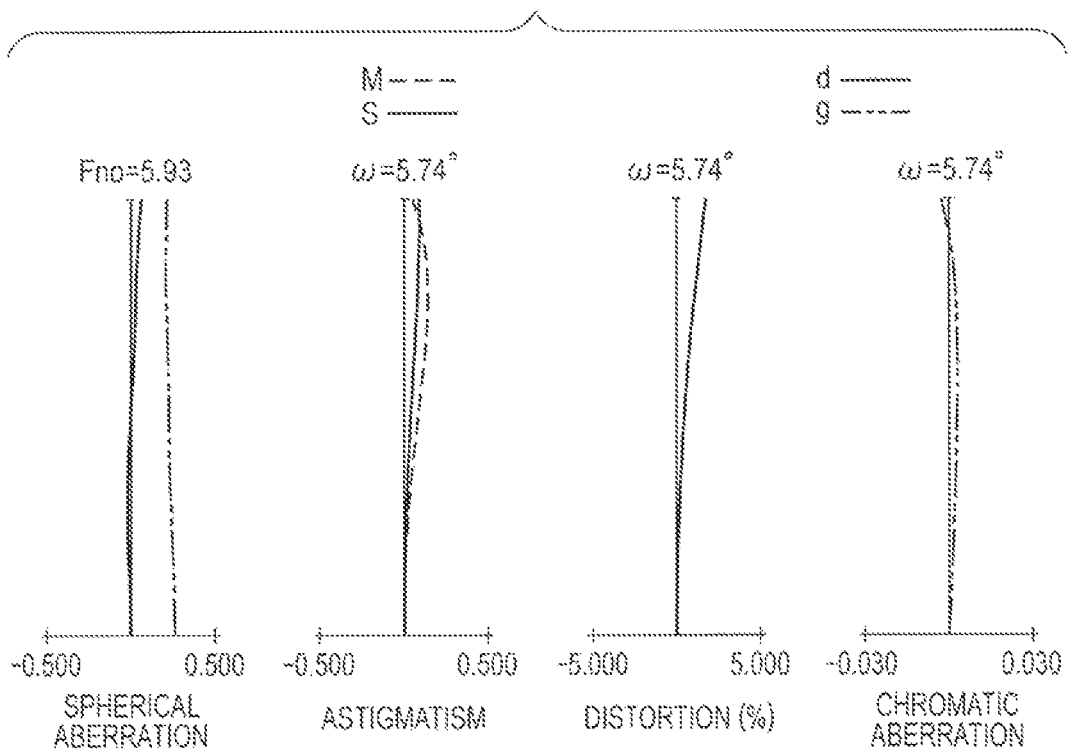
FIG. 16B is an aberration diagram of the lens on a middle zooming position according to the embodiment 8 of the present invention.
Figure 16C:
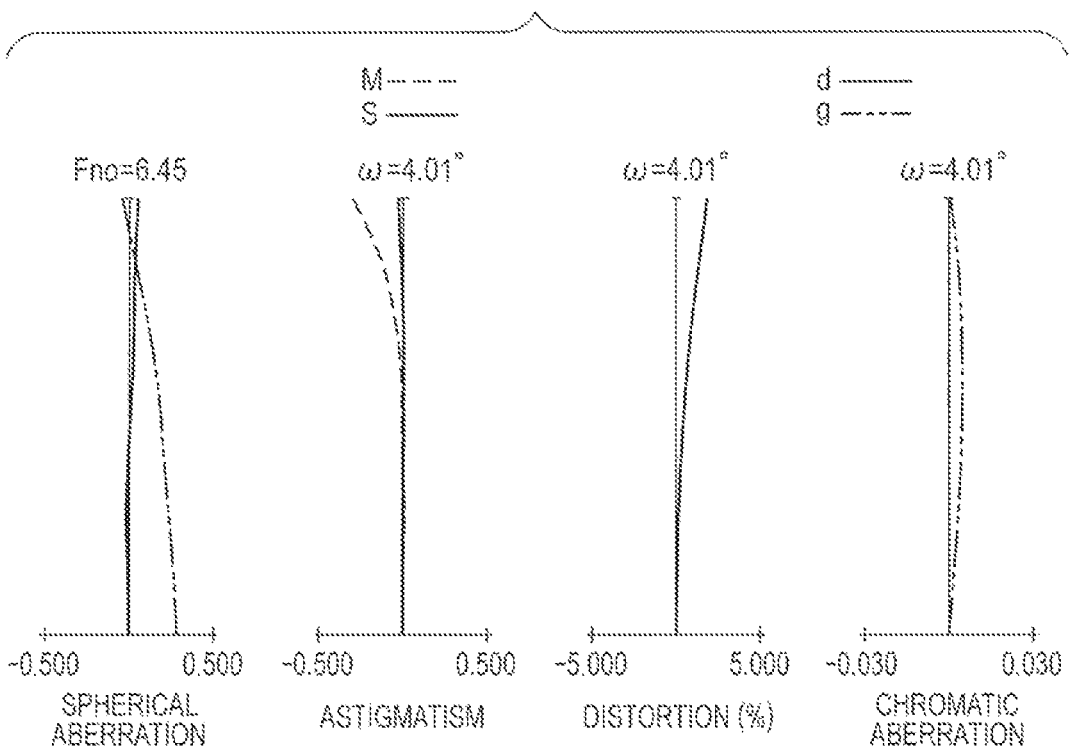
FIG. 16C is an aberration diagram of the lens on a telephoto end according to the embodiment 8 of the present invention.

FIG. 15 is a sectional view of a zoom lens on a wide angle end according to an embodiment 8 or the present invention. FIGS. 16A, 16B, and 16C are aberration diagrams of the zoom lens at a wide angle end, a middle zooming position, and a telephoto end, respectively, according to the embodiment 8. The embodiment 8 illustrates the zoom lens with a zoom ratio of 3.45 and a numerical aperture of about 4.50 to 6.45.

Figure 17:
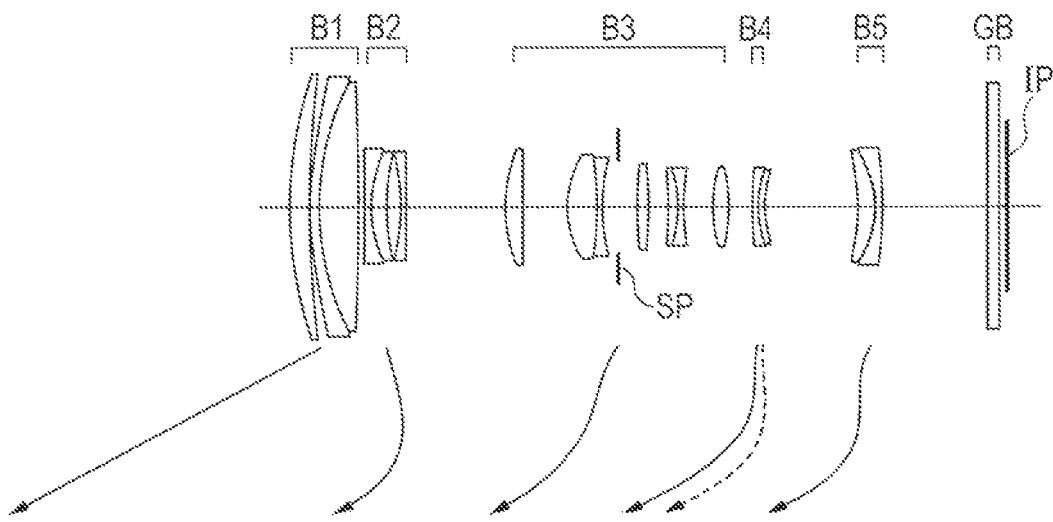
FIG. 17 is a sectional view of a lens according to an embodiment 9 of the present invention.
Figure 18A:
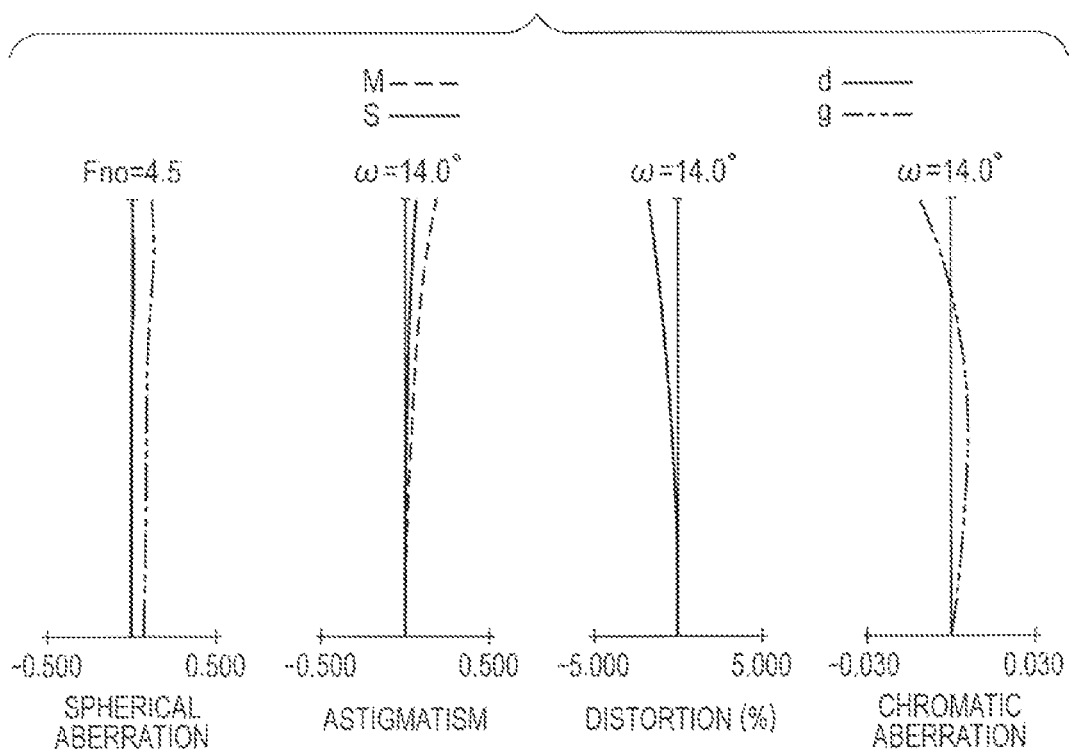
FIG. 18A is an aberration diagram of the lens on a wide angle end according to the embodiment 9 of the present invention.
Figure 18B:
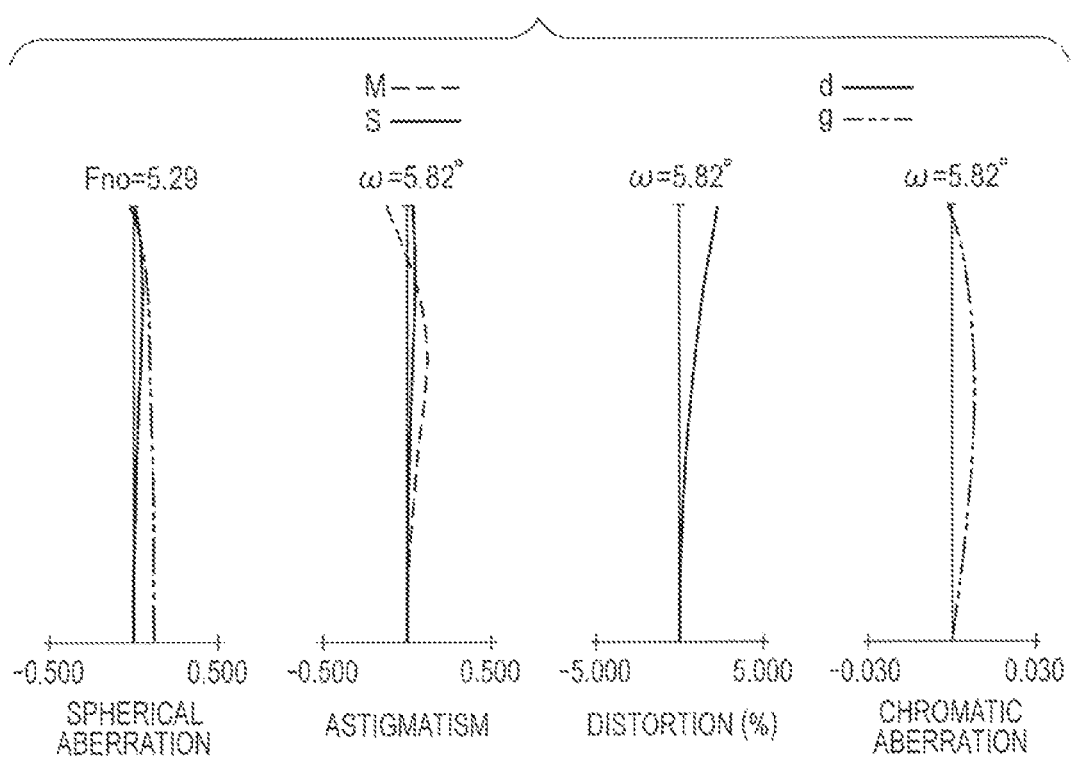
FIG. 18B is an aberration diagram of the lens on a middle zooming position according to the embodiment 9 of the present invention.
Figure 18C:
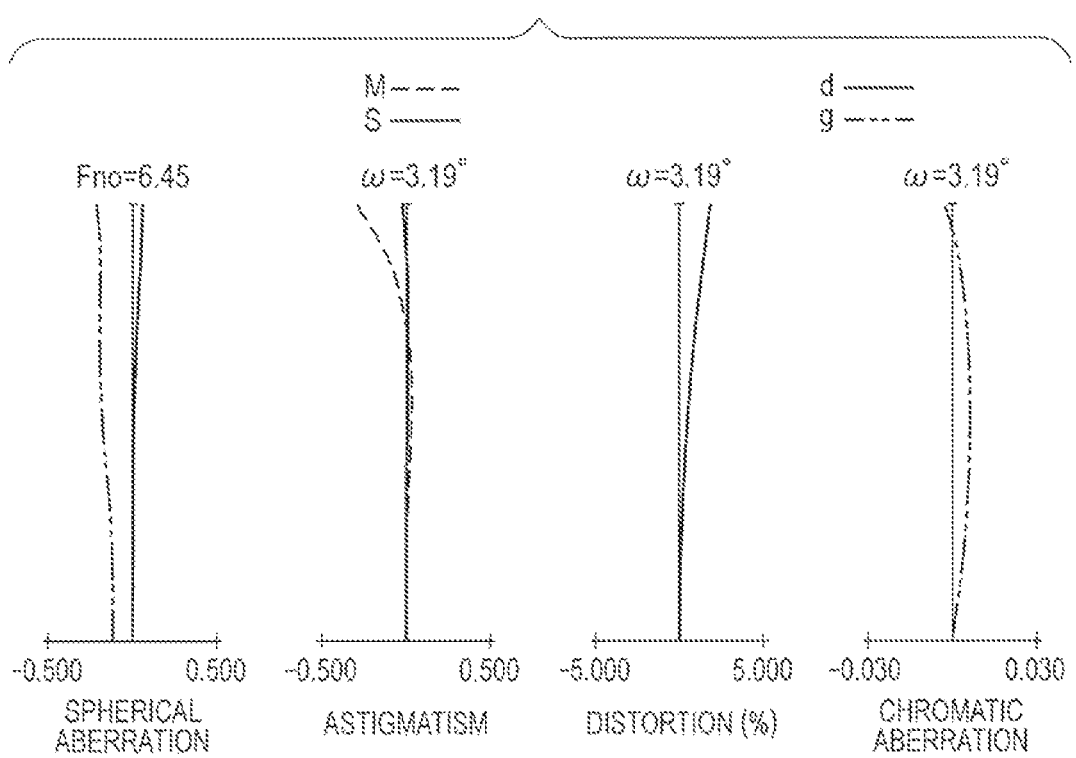
FIG. 18C is an aberration diagram of the lens on a telephoto end according to the embodiment 9 of the present invention.

FIG. 17 is a sectional view of a zoom lens on a wide angle end according to an embodiment 9 of the present invention. FIGS. 18A, 18B, and 18C are aberration diagrams of the zoom lens at a wide angle end, a middle zooming position, and a telephoto end, respectively, according to the embodiment 9. The embodiment 9 illustrates the zoom lens with a zoom ratio of 4.45 and a numerical aperture or about 4.50 to 6.45.

Figure 19:
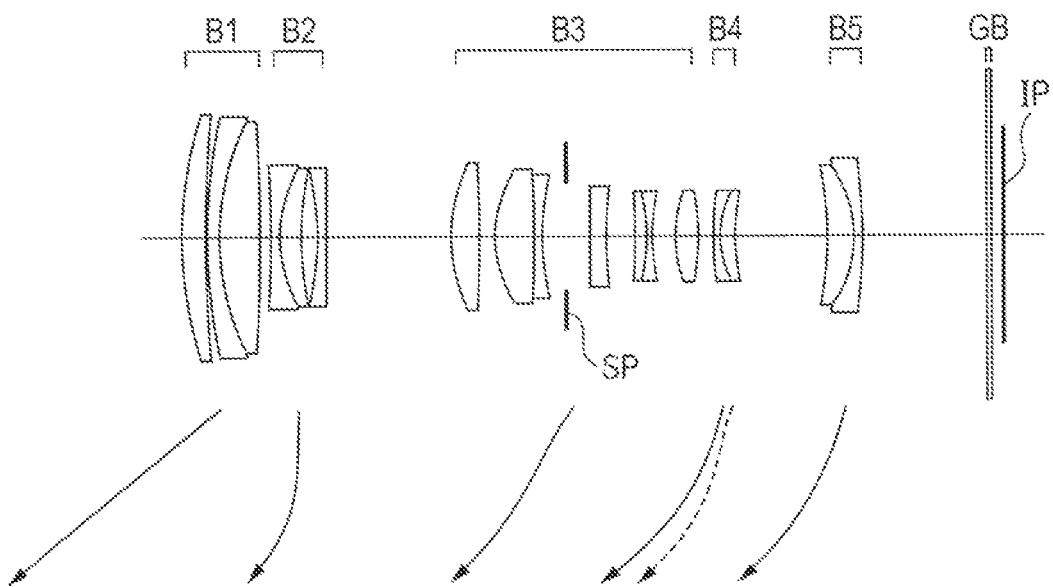
FIG. 19 is a sectional view of a lens according to an embodiment 10 of she present invention.
Figure 20A:
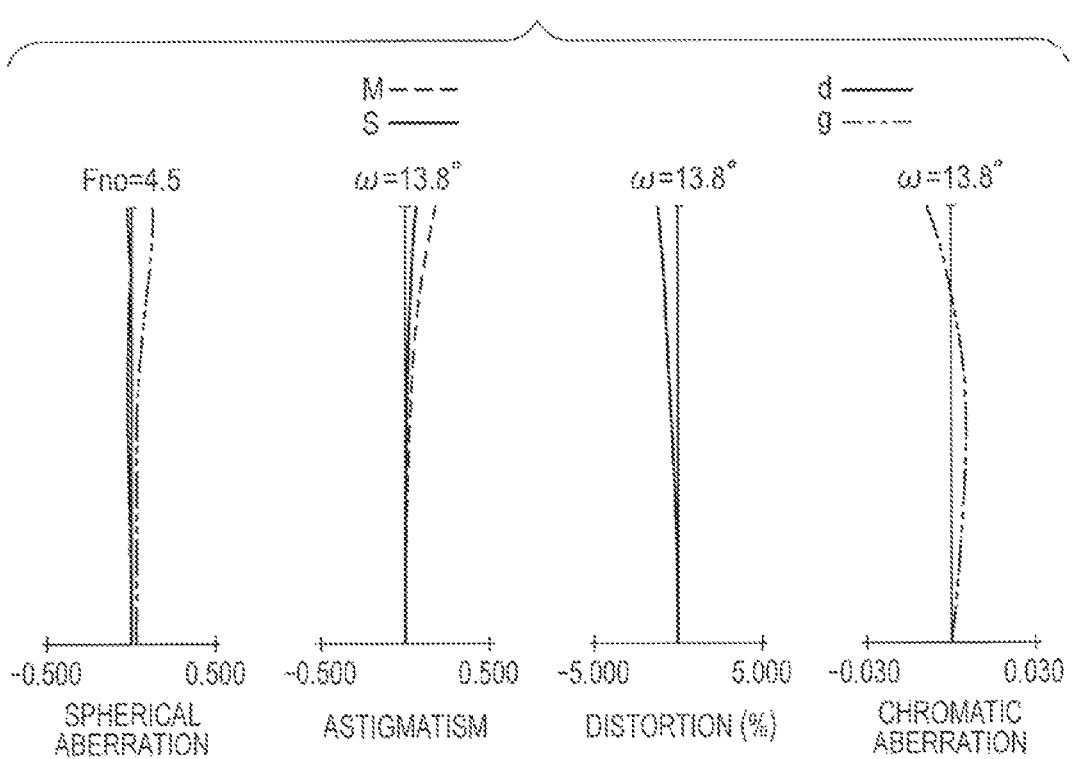
FIG. 20A is an aberration diagram of the lens on a wide angle end according to the embodiment 10 of the present invention.
Figure 20B:
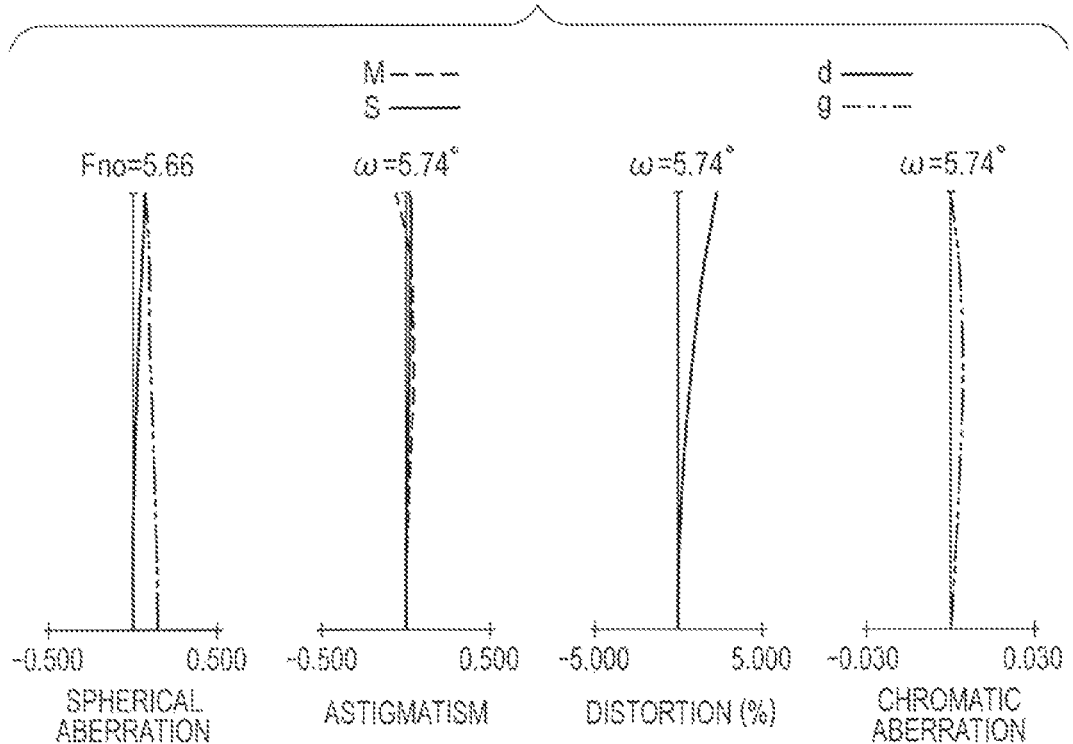
FIG. 20B is an aberration diagram of the lens on a middle zooming position according to the embodiment 10 of the present invention.
Figure 20C:
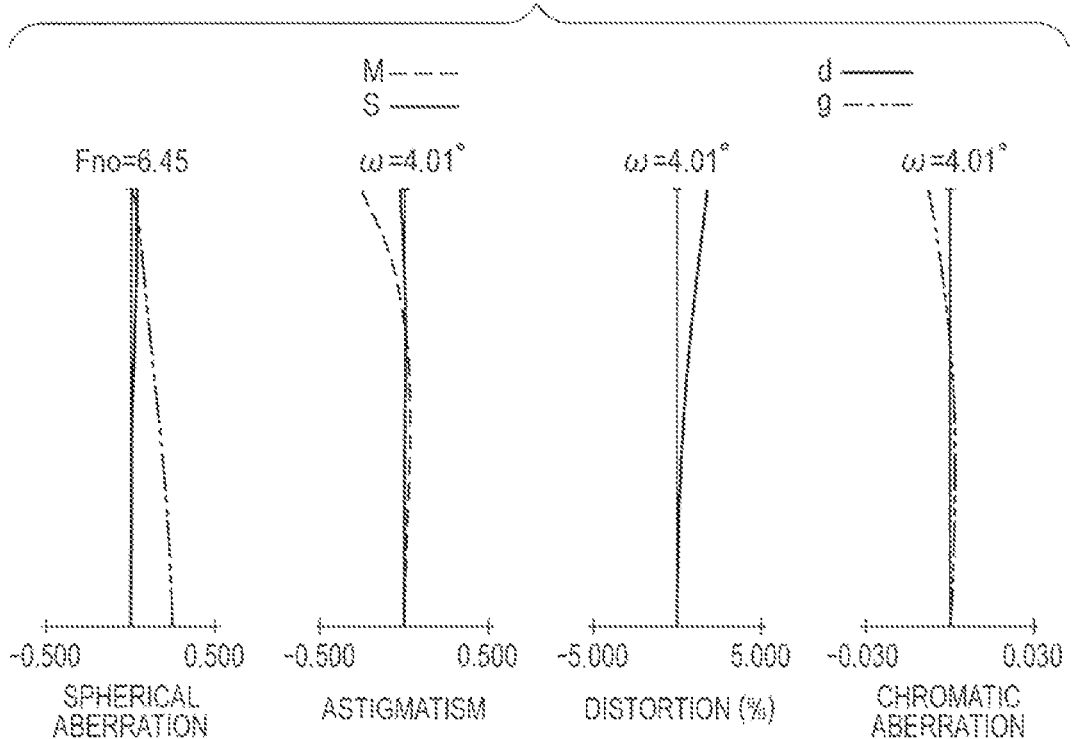
FIG. 20C is an aberration diagram of the lens on a telephoto end according to the embodiment 10 of the present invention.

FIG. 19 is a sectional view of a zoom lens on a wide angle end according to an embodiment 10 of the present invention. FIGS. 20A, 20B, and 20C are aberration diagrams of the zoom lens at a wide angle end, a middle zooming position, and a telephoto end, respectively, according to the embodiment 10. The embodiment 10 illustrates the zoom lens with a zoom ratio of 3.52 and a numerical aperture of about 4.50 to 6.45.

Figure 21:
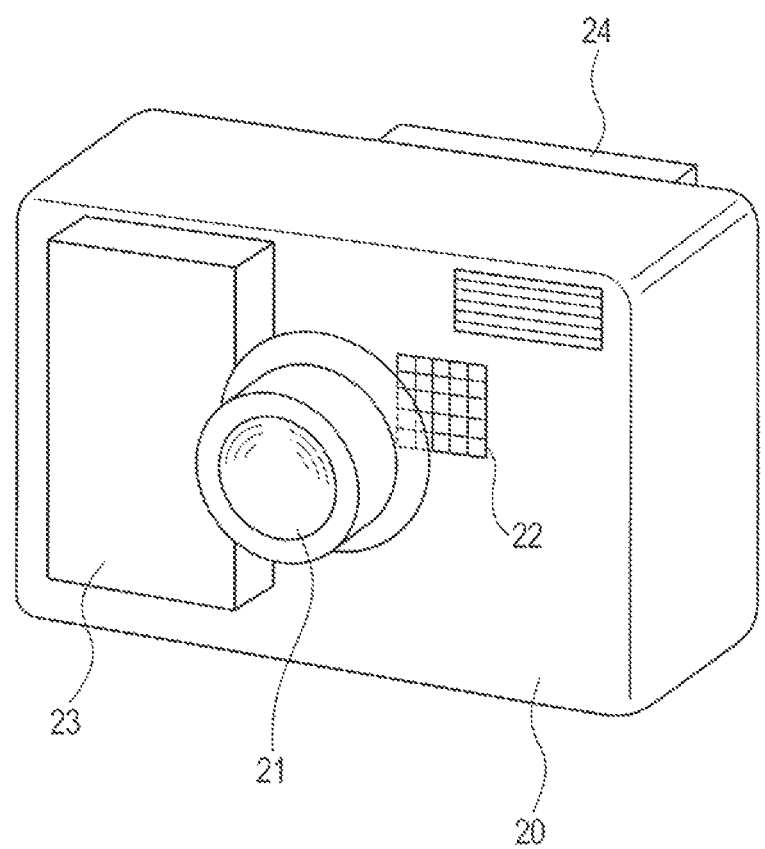
FIG. 21 is a schematic view illustrating an essential part of an image pickup device according to the present invention.

FIG. 21 is a schematic view illustrating an essential part of a digital still camera (image pickup device) including the zoom lens according to the present invention.

The zoom lens according to each embodiment is a photographing lens system used for an image pickup device such as a video camera, a digital still camera, a silver-halide film camera, or a TV camera. In the sectional views of the lens, the left side is specified as an object side (front side), and the right side is specified as an image side (rear side). In the sectional views of the lens, supposing that i is the order of the lens unit from the object side, Bi indicates the ith lens suit. LR indicates the rear unit including one or more lens units.

SP is an aperture diaphragm. GB is an optical block corresponding to an optical filter, a face plate, a low-pass filter, or an infrared cut filter. IP is an image plane. The image plane IP corresponds to an imaging plane of a solid-state image pickup device (photo-electric conversion element) such as a CCD sensor or a CMOS sensor, when the zoom lens is used as a photographing optical system of a video camera or a digital camera. The image plane IP corresponds to a film plane, when the zoom lens is used as a photographing optical system of a silver halide camera.

Each arrow indicates a moving locus of each lens unit during the zooming (variable magnification) from the wide angle end to the telephoto end. In spherical aberration diagrams, a solid line indicates a d-line (wavelength: 587.6 nm), and two-dot chain line indicates a g-line (wavelength: 435.6 nm). In astigmatism diagrams, a solid line indicates a sagittal image plane on the d-line, and a dotted line indicates a meridional image plane on the d-line. A distortion aberration for the d-line is illustrated. A chromatic aberration in magnification for the g-line is illustrated. In each embodiment described below, the wide angle end and the telephoto end mean a zooming position when the lens units for zooming are located on both ends of the range where they can move on the optical axis due to their mechanism.

Each embodiment illustrates a zoom lens including, in the order from an object side to as image side, a first lens unit B1 having a positive refractive power, a second lens unit B2 having a negative refractive power, a third lens unit B3 having a positive refractive power, and a rear unit LR including two or more lens units. The rear unit LR includes, in the order from the object side to the image side, a fourth lens unit B4 having a negative refractive power and a fifth lens unit B5 having a positive or negative refractive power. An interval between the adjacent lens units is changed in order to carry out at least either one of zooming and focusing.

The rear unit LR includes the fourth lens unit B4 having a negative refractive power and the fifth lens unit B5 having e negative refractive power in the embodiments 1, 3, 4, 5, 7, 8, and 9. In the embodiments 2, 6, and 10, the rear unit LR includes the fourth lens unit B4 having a negative refractive power and the fifth lens unit B5 having a positive refractive power. In each embodiment, the rear unit LR may include three or more lens units by arranging one or more lens units on the image side of the fifth lens unit B5.

In embodiments 1 to 7, 9, and 10, each lens unit moves during the zooming from the wide angle end to the telephoto end, whereby satisfactory aberration correction is made within the entire zoom range. During the zooming from the wide angle end to the telephoto end, the first lens unit B1 to the third lens unit B3 move to the object side. During the zooming for focusing on infinity, the fourth lens unit B4 moves integral with the third lens unit B3 or the fifth lens unit B5. During the zooming for focusing on finite distance, the fourth fens unit B4 moves integral with the third lens unit B3 or the fifth lens unit B5.

In the embodiment 8, the first, third, fourth, and fifth lens units move during the zooming from the wide angle end to the telephoto end, whereby satisfactory aberration correction is made within the entire zoom range. During the zooming from the wide angle end to the telephoto end, the second lens unit does not move. During the zooming for focusing on infinity, the fourth lens unit B4 moves integral with the third lens unit B3 or the fifth lens unit B5. During the zooming for focusing on finite distance, the fourth lens unit B4 moves integral with the third lens unit B3 or the fifth lens unit B5.

In each embodiment, the fourth lens unit having a negative refractive power is moved toward the image plane during the focusing from infinity to close distance. The quick focusing can be facilitated by using the fourth lens unit that has relatively light weight as the focus lens unit. A broken arrow involved with the fourth lens unit B4 indicates a moving locus during the zooming when the fourth lens unit focuses on a subject in a close range.

In the embodiments 1, and 4 to 3, the fourth lens unit B4 and the fifth lens unit B5 are moved integral (with the same locus) during the zooming for the focus on infinity, whereby the mechanical mechanism is simplified, and the size or the whole zoom lens is reduced. Since the focus on an infinity point causes no focus shift, it is unnecessary to move only the focus lens unit, resulting in that the focus shift can be prevented, and the increase in the operating noise generated during the focusing operation can be reduced. The fourth lens unit B4 may move integral with the other lens units such as the third lens unit.

In the embodiment 2, the fourth lens unit B4 end the fifth lens unit B5 move integrally during the zooming for focusing on an object with the distance (the distance from the image plane) of 4 m. The fourth lens unit B4 may move integral with the third lens unit B3.

In the embodiment 3, the fourth lens unit B4 and the third lens unit B3 move integrally during the zooming for focusing on infinity. The fourth lens unit B4 may move integral with the other lens units such as the fifth lens unit.

In the embodiments 1 to 6, the fourth lens unit B4 and optional lens unit may move integrally during the zooming. In the embodiments 1 to 6, the fourth lens unit B4 makes the focusing operation. However, the similar effect can be obtained even by performing the focusing operation by any lens unit, having the negative refractive power, closer to the image from the third lens unit B3. Therefore, the focus lens unit is not limited to the fourth lens unit B4.

The zoom lens according to each of the embodiments 1 to 6 of the present invention includes the first, second, and third lens units B1 to B3 having respectively positive, negative, and positive refractive powers, and the rear unit LR including two or more lens units, in the order from the object side to the image side, in order to assure satisfactory zoom ratio with the compact size. The zoom lens also aims to have high optical performance and reduce the size of the whole zoom lens by arranging the negative focus lens unit on the rear unit LR and by appropriately setting the refractive power and the coving locus during the zooming of each lens unit. The zoom lens also reduces the size of the focus lens unit, and facilitates the high-speed focusing.

In general, a zoom lens including, in the order from the object side to the image side, lens units having respectively positive, negative, and positive refractive powers, and a rear unit having two or more lens units near the image side can easily provide high zoom ratio and high optical performance with a compact size. In particular, a zoom lens including, in the order from the object side to the image side, first lens unit to third lens unit having respectively positive, negative, and positive refractive powers, and a rear unit, having larger negative refractive power, on the side closer to the image than the third lens unit can shorten exit pupil distance, thereby being capable of reducing the length of the entire zoom lens.

When the third lens unit is formed to have strong positive refractive power, on-axis flux emitted from the third lens unit is converged to reduce the height of the incident flux incident on the rear unit. The height of off-axis flux is also reduced. Therefore, the effective diameter of the rear unit becomes relatively small, and the focus lens unit can be downsized and lightweight by using the lens unit having the negative refractive power in the rear unit as the focus lens unit.

In the embodiments 1 to 6, the focus lens unit moves integral with the other leas units during the zooming for the specific object distance. This configuration can integrate the zooming operation mechanism to simplify the mechanical mechanism. This configuration in which the focus lens unit mosses with the other lens units also prevents the focus shift and the generation of operating noise with the minimum focusing operation during the zooming for the specific object distance.

The specific object distance by which the focus lens unit memos integral wish the other lens units may be set to a long distance that is frequently used, if the zoom lens is a telephoto zoom lens, and may be set to a close distance, if the score lens is a wide angle zoom lens. If the specific object distance is set to a middle distance, the zoom lens can easily focus on both an object with a long distance and en object with a close distance. In this way, any specific object distances can be selected.

When the focus lens unit having a strong negative refractive power is arranged in order to downsize the whole zoom lens, much aberration occurs on the focus lens unit, so that the correction of various aberrations becomes difficult. Therefore, it is desirable to arrange a lens unit for correcting a field curvature and chromatic aberration in magnification on the side closer to the image from the focus lens unit. It is also desirable that the fourth lens unit B4 is the focus lets unit having a negative refractive power, and the fifth fens unit B5 having a positive or negative refractive power is arranged. The number of the lens units may be increased in order to realize higher performance.

When the lens unit having a negative refractive power is arranged on the image side of the feces lens unit to set she combined focal length of the rear unit LR closer to the image side than the third lens unit B3 to have a negative refractive power, the exit pupil distance can optionally be changed to shorten the back focus, whereby the entire zoom lens can easily be downsized. It is preferable that at least three lens units including the first lens unit B1 move during the zooming. The movement of plural lens units including the first lens unit B1 can realize the reduction in size of the entire zoom lens and is easy to prevent the variation in various aberrations during she zooming.

On the other hand, when the entire zoom lens is downsized to reduce the back focus, the effective diameter of the lens unit closest to the image plane is likely to increase. The reason of this is as follows. Specifically, when the image pickup element and the last lens unit become close to each other due to the reduction in size of the entire zoom lens, the effective diameter of the lens unit closest to the image plane needs to he made large in order to pass much off-axis flux.

In view of this, in each embodiment, the lens unit, arranged close to the image from the third lens unit and arranged in the last lens unit to be close to the object side, is specified as the focus lens unit. The lens unit can be divided based upon the change in the interval between the lens units on the optical axis during the zooming or the focusing, and the lens unit is defined to include not only a lens unit including plural lens units but also a lens unit including a single lens unit.

In each embodiment, the distance from the lens surface of the lens, closest to the object side, in the focus lens unit at a wide angle end to the image plane is defined as Lfsk. The distance from the lens surface of the lens, closest to the object side, in the focus lens unit on the wide angle end to the lens surface of the lens on the image side, closest to the image side, in the entire zoom lens is defined as Lf. In this case, a conditional expression of $$1.4 < Lfsk/Lf < 4.0 \tag{1}$$

is satisfied.

The conditional expression (1) is involved with the arrangement of the focus lens unit in rite optical axis direction. When the focus lens unit becomes close to the third lens unit B3 over the upper limit of the conditional expression (1), the size of the focus lens unit, can easily be reduced, but the distance from the focus lens unit to the image plane increases, which makes it difficult to reduce the size of the entire zoom lens. When the focus lens unit becomes close to the image plane over the lower limit of the conditional expression (1), it becomes difficult to pass the off-axis flux unless the lens diameter increases for the focusing. Accordingly, the effective diameter and the weight of the focus lens unit increase, and this is not preferable.

In the embodiments 1 to 6, the focus lens unit moves integral with the lens unit other than the focus lens unit during the zooming on any focused length. Since the focus lens unit mores integral with the lens unit other than the focus lens unit, the zooming operation mechanism can be integrated, whereby the mechanical mechanism can be simplified. According to the configuration in which the focus lens unit moves integral with the other lens unit during the zooming, the focus shift during the zooming for an object with any distance can be prevented, and only a slight focusing operation is carried out to prevent the increase in operating noise.

Any focused length for an object during the zooming in which the focus lens unit mores integral with the other lens unit may be decided according to a specification. For example, when the zoom lens is a telephoto zoom lens, the focused length may be set according to an object with a long distance, this focused length being expected to be frequently used. When the zoom lens is a wide angle zoom lens, the focused length may be set according to an object with relatively a close distance. If the focused length is set according to an object with a middle distance, the zoom lens easily and quietly focuses on an object with a long distance and an object with a close distance. As described above, any focused length for an object may be selected. It is more preferable that a lens unit having a negative or positive refractive power is arranged on the image side of the focus lens unit.

When the focus lens unit having a strong negative refractive power is arranged in order to downsize the entire zoom lens, aberration greatly occurs on the focus lens unit. Therefore, it is desirable to arrange a lens unit for correcting a field curvature and chromatic aberration in magnification on the side closer to the image from the focus lens unit. It is also desirable that the fourth lens unit B4 is the focus fens unit having a negative refractive power, and the fifth lens unit B5 having a positive or negative refractive power is arranged on the side of the image plane. The number of the lens units may be increased in order to realize higher performance.

In each embodiment, five lens units move during the zooming. The variation in the chromatic aberration during the focusing is reduced by arranging at least one positive lens and one negative lens in the focus lens unit. Preferably, each embodiment satisfies one or more conditional expressions described below. The focal length of the first lens unit B1 is defined as f1. The focal length of the second lens unit B1 is defined as f2. The focal length of the third lens unit B3 is defined as f3. The combined focal length of the rear unit on the wide angle end is defined as fn. The focal length of the focus lens unit is defined as ff. The combined focal length of the lens unit arranged closer to the image side than the focus lens unit on the wide angle end is defined as fi.

The length or the zoom lens on the telephoto end is defined as T1. The focal length of the zoom lens on the telephoto end is defined as ft. The focal length of the zoom lens on the wide angle end is defined as fw. The back focus on the wide angle end is defined as Wsk. In this case, the zoom lens preferably satisfies one or more conditional expressions described below.

$$0.3 < f2/fn < 1.0 \quad (2)$$

$$15.0 < |fi/ff| < 250.0 \quad (3)$$

$$1.5 < f1/|fn| < 5.0 \quad (4)$$

$$0.6 < T1/ft < 0.8 \quad (5)$$

$$0.1 < |f2|/fw < 1.0 \quad (6)$$

$$0.8 < |f1|/Wsk < 3.0 \quad (7)$$

$$0.3 < f3/|fn| < 1.5 \quad (8)$$

$$0.05 < |f2|/ft < 0.20 \quad (9)$$

The technical meaning of each conditional expression described above will be described.

The conditional expression (2) specifies a ratio between the focal length (reciprocal of a refractive power) of the second lens unit B2 having a main zooming function and the combined focal length of the rear unit LR closer to the image side than the third lens unit B3 on the wide angle end. When the combined refractive power (negative refractive power) of the rear unit LR becomes stronger than the upper limit of the conditional expression (2), the size of the entire zoom lens is easily reduced, but the exit pupil distance becomes too short, so that image quality is liable to deteriorate. When the negative refractive power of the second lens unit B2 becomes stronger than the lower limit of the conditional expression (2), distortion aberration increases on the wide angle end, and the variation in the field curvature during the zooming increases. The correction of these aberrations is difficult.

The conditional expression (3) specifies a ratio between the refractive power (reciprocal of a focal length) of the focus lens unit and the combined focal length of the lens unit closer to the image side than the focus lens unit on the wide angle end. When the negative refractive power of the focus lens unit becomes weaker than the lower limit of the conditional expression (3), the moving distance of the focus lens unit during the focusing increases, which makes it difficult to reduce the size of the entire zoom lens. When the refractive power of the focus lens unit becomes stronger than the upper limit of the conditional expression (3), the size of the entire zoom, leas is easily reduced, since the moving distance of the focus lens unit during the focusing is decreased. However, the variation in various aberrations during use focusing increases.

The conditional expression (4) specifies a ratio between the focal length of the first lens unit B1 and the combined focal length of the rear unit LR closer to the image side than the third lens unit B3 on the wide angle end. When the refractive power of the first lens unit B1 becomes wearer than the upper limit of the conditional expression (4), a predetermined zoom ratio cannot be obtained, unless the moving amount of the first lens unit B1 increases during the zooming. Therefore, the reduction in size of the entire zoom fens becomes difficult. When the refractive power of the first lens unit B1 becomes stronger than the lower limit of the conditional expression (4), the moving amount of the first lens unit B1 during the zooming can be decreased, so that, the size of the entire zoom lens can easily be reduced. However, on-axis chromatic aberration on the telephoto end increases, and this aberration is difficult to be corrected.

The conditional expression (5) specifies a ratio between the total length (the distance from the first lens surface to the image plane) of true zoom ions on the telephoto end and the focal length of the zoom lens on the telephoto end. When the total length of the zoom lens becomes longer than the upper Limit of the conditional expression (5) on the telephoto end, the reduction in size of the entire zoom lens becomes difficult. When the total length of the zoom lens is shorter than the lower limit or the conditional expression (5) on true telephoto end, on-axis chromatic aberration and spherical aberration increase on the telephoto end, and these aberrations are difficult to be corrected. Therefore, many special materials having abnormal dispersion performance and aspherical lenses have to be used, and this is not preferable.

The conditional expression (6) specifies a ratio between the focal length of the second lens unit B2 having the main zooming function and the focal length of the entire zoom lens on the wide angle end.

When the negative refractive power of the second lens unit B2 becomes weaker than the upper limit of the conditional expression (6), various aberrations are easy to be corrected, but it becomes difficult to obtain a desired zoom ratio. When the negative refractive power of the second lens unit B2 becomes stronger than the lower limit of the conditional expression (6), the distortion aberration on the wide angle end increases, and the variation in the field curvature curing the zooming increases. This is not desirable.

The conditional expression (7) specifies a ratio between the focal length of the focus lens unit and the back focus on the wide angle end. When the refractive power of the focus lens unit becomes weaker than the upper limit of the conditional expression (7), the moving distance of the focus lens unit during the focusing increases, so that it becomes difficult to reduce the size of the entire zoom lens. When the back focus becomes longer than the lower limit of the conditional expression (7), the reduction in size of the entire zoom lens becomes difficult.

The conditional expression (8) specifies a ratio between the focal length of the focus lens unit and the focal length of the third lens unit B3. When the refractive power of the third lens unit B3 becomes weaker than the upper limit of the conditional expression (8), various aberrations are easy to be corrected, but it becomes difficult to reduce the size of the entire zoom lens, particularly the total length of the entire zoom lens. When the refractive power of the third lens unit B3 becomes stronger than the lower limit of the conditional, expression (8), the spherical aberration and off-axis coma aberration are difficult to be corrected on the wide angle end.

The conditional expression (9) specifies a ratio between the focal length of the second lens unit B2 having the main zooming function and the focal length of the entire zoom lens on the telephoto end. When the refractive power of the second lens unit B2 becomes weaker than the upper limit of the conditional expression (9), various aberrations are easy to be corrected, but it becomes difficult to reduce the size of the entire zoom lens, particularly the total length of the entire zoom lens. When the refractive power of the second lens unit B2 becomes stronger than the lower limit of the conditional expression (9), the field curvature and the chromatic aberration in magnification are difficult to be corrected on the wide angle end.

Preferably, the numerical ranges of the conditional expressions (1) to (9) are set as stated below, $$1.6 < Lfsk/Lf < 3.5 \tag{1a}$$

$$0.4 < f2/fn < 0.8 \tag{2a}$$

$$18 < |fi/ff| < 220 \tag{3a}$$

$$2.0 < f1/|fn| < 4.0 \tag{4a}$$

$$0.70 < T1/ft < 0.78 \tag{5a}$$

$$0.3 < |f2|/fw < 0.8 \tag{6a}$$

$$1.0 < |ff|/Wsk < 2.0 \tag{7a}$$

$$0.5 < f3/|fn| < 1.3 \tag{8a}$$

$$0.07 < |f2|/ft < 0.15 \tag{9a}$$

More preferably, the numerical ranges of the conditional expressions (1a) to (9a) are set as stated below, $$1.8 < Lfsk/Lf < 3.2 \tag{1b}$$

$$0.55 < f2/fn < 0.70 \tag{2b}$$

$$21 < |fi/ff| < 205 \tag{3b}$$

$$2.3 < f1/|fn| < 3.5 \tag{4b}$$

$$0.73 < T1/ft < 0.76 \tag{5b}$$

$$0.35 < |f2|/fw < 0.50 \tag{6b}$$

$$1.30 < |ff|/Wsk < 1.95 \tag{7b}$$

$$0.6 < f3/|fn| < 1.1 \tag{8b}$$

$$0.08 < |f2|/ft < 0.13 \tag{9b}$$

In the embodiments 7, 8, 9, end 10, the zoom lens includes the fourth lens unit B4 having a negative refractive power and the fifth lens unit B5, wherein the fourth lens unit carries out the focusing. In this case, the fourth lens unit and the fifth lens unit move with the different locus. However, the difference in the moving amount is reduced by setting appropriate power, whereby the moving mechanism can be simplified, and the entire zoom lens can easily be reduced in size, as in the embodiments 1 to 6.

In general, a zoom lens including, in the order from the object side to the image side, lens units having respectively positive, negative, positive and negative refractive powers, and a rear unit having one or more lens units near the image side can easily provide high zoom ratio and high optical performance with a compact size.

In particular, a zoom lens including, in the order from the object side to the image side, first lens unit to third lens unit having respectively positive, negative, and positive refractive powers, end a rear unit, having stronger negative refractive power, on the side closer to the image than the third lens unit can shorten exit pupil distance, thereby being capable of reducing she length of the entire zoom lens.

When the third lens unit is formed to have a strong positive refractive power, on-axis flux emitted from the third lens unit is converged to reduce the height of the incident flux incident on the rear unit. The height of off-axis flax is also reduced. Therefore, the effective diameter of the rear unit becomes relatively small in the entire zoom lens. Accordingly, the lens unit, having the negative refractive power, in the rear unit on the image side of the third lens unit is specified as the focus lens unit.

According to this configuration, the size and the weight of the focus lens unit can be reduced. When the entire zoom lens is downsized to shorten the back focus, the effective diameter of the lens unit closest to the image plane is likely to increase. The reason of this is as follows. Specifically, when the image pickup element and the last lens unit become close to each other due to the reduction in size of the entire zoom lens, the effective diameter of the lens unit closest to the image plane needs to be made large in order to pass much off-axis flux.

Accordingly, the fourth lens unit is used as the focus lens unit.

A double telephoto-type structure can be made by forming the fourth lens unit to have the negative refractive power. This configuration brings an effect in which a short optical system is easy to be realized.

It is preferable that the fourth lens unit used for the focusing has the strong refractive power in order to reduce the moving amount during the focusing as much as possible. This is because, the smaller the moving amount is, the more the driving mechanism can be reduced.

However, when the refractive power of the fourth lens unit increases, the variation in the field curvature and the chromatic aberration in magnification also increases. Therefore, it is preferable that the fifth lens unit having a negative or positive refractive power is arranged on the side of the image plane to correct the field curvature and the chromatic aberration in magnification.

The zoom lens in each embodiment is characterized by simultaneously satisfying the conditional expressions of:

$$0.55 < f2/f4 < 0.8 \quad (10)$$

$$0.6 < T1/ft < 0.8 \quad (11)$$

when the focal length of the second lens unit is defined as f2, the focal length of the fourth lens unit is defined as f4, the focal length of the zoom lens on the telephoto end is defined as ft, and the length of the entire zoom lens on the telephoto end is defined as T1. The conditional expression (10) specifies a ratio between the focal length of the second lens unit B2 having the main zooming function and the focal length of the fourth lens unit B4 that carries out the focusing operation.

When the refractive power of the fourth lens unit becomes stronger than the upper limit of the conditional expression (10), the moving amount during the focusing can be reduced, but the variation in the field curvature and the chromatic aberration in magnification caused by the focusing increases, thereby the correction is difficult. When she refractive power of the fourth lens unit becomes weaker than the lower limit of the conditional expression (10), the variation in various aberrations during the focusing can easily be prevented, but the moving amount during the focusing increases. This is not preferable for the reduction in site of the zoom lens.

When a zoom lens simultaneously satisfies the conditional expression (10) and the conditional expression (5), this zoom lens can be downsized and have a high optical performance.

In each embodiment, five lens units move during the zooming. The variation in the chromatic aberration during the focusing is reduced by arranging at least one positive lens and one negative lens in the focus lens unit. Preferably, each embodiment satisfies one or more conditional expressions described below together with the conditional expressions (10) and (5). The focal length of the first lens unit B1 is defined as f1. The focal length of the second lens unit B2 is defined as f2. The focal length of the fourth lens unit B4 is defined as f4. The focal length of the entire zoom lens on the telephoto end is defined as ft. In this case, the zoom lens preferably satisfies one or more conditional expressions described below.

$$1.0 < ft/f1 < 3.5 \quad (11)$$

$$6.0 < |ft/f2| < 12.0 \quad (12)$$

$$5.0 < |ft/f4| < 7.5 \quad (13)$$

$$1.5 < |f1/f4| < 4.0 \quad (14)$$

The technical meaning of each conditional expression described above will be described.

The conditional expression (11) specifies a ratio between the focal length of the first lens unit B1 and the focal length of the entire zoom lens on the telephoto end. When the focal length f1 of the first lens unit E1 becomes smaller than the upper limit of the conditional expression (11), the spherical aberration and the on-axis chromatic aberration are difficult to be corrected.

When the focal length of the first lens unit B1 becomes larger than the lower limit of the conditional expression (11), the refraction by the first lens unit is reduced, and the diameter of the lens has to be increased. This is not preferable for reducing the size of the entire zoom lens.

The conditional expression (12) specifies a ratio between the focal length of the second lens unit B2 having the largest refractive power in the entire zoom lens and the focal length of the entire zoom lens on the telephoto end. When the focal length f2 of the second lens unit B2 becomes smaller than the upper limit of the conditional expression (12), the seeming function becomes strong. Therefore, high zoom can be attained wish the small moving amount, and this is preferable for reducing the size. However, it becomes difficult to prevent the distortion aberration on the wide angle end and the variation in the field curvature within the entire zoom range.

When the focal length f2 of the second lens unit B2 becomes larger than the lower limit of the conditional expression (12), the moving amount of the second lens unit or the other lens units has to be increased in order to assure the desired zooming. This is not preferable for the reduction in size.

The conditional expression (13) specifies a ratio between the focal length of the fourth lens unit B4 performing the focusing operation and the focal length of the entire zoom lens on the telephoto end. When the focal length f4 of the fourth lens unit B4 becomes smaller than the upper limit of the conditional expression (13), the focusing can be realized with a small moving amount, and this is preferable for the reduction in size of a system including a driving unit and for preventing noise. However, it becomes difficult to prevent the variation in the spherical aberration and field curvature during the focusing.

When the focal length f4 of the fourth lens unit B4 becomes larger that the lower limit of the conditional expression (13), the moving amount during the focusing becomes too large, and this is not preferable for the reduction in size of the entire zoom lens.

The conditional expression (14) specifies a ratio between the focal length of the first lens unit B1 and the focal length of the fourth lens unit B4. When the focal length f4 of the fourth fens unit B4 becomes smaller than the upper limit of the conditional expression (14), the focusing operation can be realized with a small moving amount, and this is preferable for the reduction in size of a system including a driving unit and for preventing noise. However, it becomes difficult to prevent the variation in the spherical aberration and field curvature during the focusing.

When the focal length f4 of the fourth lens unit B4 becomes larger than the lower limit of the conditional expression (14), the moving amount during the focusing becomes too large, and this is not preferable for the reduction in size of the entire zoom lens.

Preferably, the numerical ranges of the conditional expressions (11) to (14) are set as stated below.

$$1.5 < ft/f1 < 2.8 \quad (11a)$$

$$6.5 < |ft/f2| < 11.5 \quad (12a)$$

$$5.3 < |ft/f4| < 7.3 \quad (13a)$$

$$2.0 < |f1/f4| < 3.5 \quad (14a)$$

More preferably, the numerical ranges of the conditional expressions (11a) to (14a) are set as stated below.

$1.8 < ft/f1 < 2.2$ (11b)

$7.0 < ft/|f2| < 11.0$ (12b)

$5.5 < ft/|f4| < 7.0$ (13b)

$2.5 < f1/|f4| < 3.3$ (14b)

As described above, each embodiment can provide a compact zoom lens having high optical performance and high zoom ratio, wherein a size and weight of a focus lens unit can be reduced. Therefore, each embodiment easily realizes an image pickup device including a quiet and quick focusing function with reduced size including a mechanical mechanism.

Next, an embodiment of a digital camera (image pickup device) using the zoom lens according to the present invention as a photographing optical system will be described with reference to FIG. 21. FIG. 21 illustrates a digital camera body 20 and a photographing optical system 21 including the zoom lens according to the embodiments described above. The digital camera includes an image pickup element (photoelectric conversion element) 22, such as a CCD, receiving a subject image (image) by the photographing optical system 21, and a recording unit 23 that records the subject image received by the image pickup element 22. The digital camera also includes a viewfinder 24 by which a user observes the subject image displayed onto a display device not illustrated.

The display device is composed or a liquid crystal panel, and displays the subject image formed on the image pickup element 22. The application of the zooms lens according to the present invention to an image pickup device such as a digital camera realizes a compact image pickup device having high optical performance.

Specific numerical data in numerical examples 1 to 10 corresponding to the embodiments 1 to 10 will be described below. In each numerical example, i indicates the number of the surface counted from the object side. ri indicates a curvature radius of the ith optical surface (the ith surface). di indicates an interval between the ith surface and the (i+1)th surface on the axis. ndi and vdi respectively indicate a refractive index and Abbe number of the material of the ith optical member relative to the d-line. Two surfaces closest to the image correspond to a glass block G. The aspherical shape is represented by an equation of:

$$X = \frac{H^2/R}{1+\sqrt{1-(1+K)(H/R)^2}} + A4H^4 + A6H^6 + A8H^8 + A10H^{10} + A12H^{12}$$ [Equation 1]

wherein an optical axis direction is defined as X axis, a direction perpendicular to the optical axis is defined as H axis, an advancing direction of light is defined as positive, R is defined as a paraxial curvature radius, K is defined as a conic constant, and A4, A6, A3, A10, and A12 are respectively defined as aspherical constants. * means a plane having an aspherical shape. "e-x" means $10^{-x}$. BF indicates a back focus, and this is represented by the distance from the surface of the last lens to the image plane in terms of air. A wide angle means tee wide angle end, a middle means the middle zooming position, and a telephoto means the telephoto end. Table 1 represents the relationship between each conditional expression and each numerical example.

Numerical Example 1

| unit mm | | | | |
|---|---|---|---|---|
| surface data | | | | |
| Surface number | r | d | nd | vd |
| 1 | 47.579 | 3.00 | 1.48749 | 70.2 |
| 2 | 187.623 | 0.20 | | |
| 3 | 72.401 | 1.50 | 1.80610 | 40.9 |
| 4 | 32.025 | 5.20 | 1.48749 | 70.2 |
| 5 | −270.270 | (variable) | | |
| 6 | −108.486 | 0.90 | 1.72000 | 50.2 |
| 7 | 16.905 | 2.70 | 1.84666 | 23.9 |
| 8 | 41.931 | 2.01 | | |
| 9 | −34.559 | 0.90 | 1.77250 | 49.6 |
| 10 | 270.270 | (variable) | | |
| 11 | 21.716 | 3.60 | 1.66672 | 48.3 |
| 12 | −147.608 | 1.90 | | |
| 13 | 16.044 | 5.00 | 1.49700 | 81.5 |
| 14 | −65.374 | 0.90 | 1.84666 | 23.9 |
| 15 | 32.233 | 2.90 | | |
| 16(diaphragm) | ∞ | 3.10 | | |
| 17* | 98.001 | 2.20 | 1.58313 | 59.4 |
| 18* | 5000.000 | 3.50 | | |
| 19 | −74.987 | 1.50 | 1.80610 | 33.3 |
| 20 | −18.582 | 0.60 | 1.69350 | 53.2 |
| 21 | 24.830 | 3.00 | | |
| 22 | 18.004 | 2.80 | 1.48749 | 70.2 |
| 23 | −32.642 | (variable) | | |
| 24 | 258.313 | 0.60 | 1.69680 | 55.5 |
| 25 | 11.294 | 2.00 | 1.54072 | 47.2 |
| 26 | 29.836 | 12.63 | | |
| 27 | −28.543 | 3.30 | 1.76200 | 40.1 |
| 28 | −13.619 | 1.00 | 1.51633 | 64.1 |
| 29 | −72.548 | (variable) | | |
| 30 | ∞ | 1.70 | 1.54400 | 60.0 |
| 31 | ∞ | 1.6 | | |
| image plane | ∞ | | | |

| aspherical data | | |
|---|---|---|
| 17th surface | | |
| K = 0.00000e+000 | A 4 = −7.46980e−005 | A 6 = 6.83135e−007 |
| A 8 = 6.66992e−009 | A10 = −5.06108e−011 | A12 = −9.57784e−014 |
| 18th surface | | |
| K = 0.00000e+000 | A 4 = 4.14298e−005 | A 6 = 1.13094e−006 |
| A 8 = 6.67895e−009 | | |

| various data | | | |
|---|---|---|---|
| zoom ratio 3.45 | | | |
| | wide angle | middle | telephoto |
| focal length | 56.60 | 134.00 | 195.00 |
| F-number | 4.50 | 5.70 | 6.45 |
| half viewing angle (degree) | 13.57 | 5.82 | 4.01 |
| image height | 13.66 | 13.66 | 13.66 |
| total length | 103.39 | 130.12 | 144.77 |
| BF | 17.70 | 28.38 | 40.78 |
| d 5 | 1.40 | 26.09 | 34.14 |
| d10 | 15.35 | 4.17 | 0.80 |
| d23 | 2.00 | 4.54 | 2.10 |
| d29 | 15.00 | 25.68 | 38.08 |

| zoom leas unit data | | |
|---|---|---|
| unit | start surface | focal length |
| 1 | 1 | 93.52 |
| 2 | 6 | −21.90 |
| 3 | 11 | 26.02 |
| 4 | 24 | −33.93 |
| 5 | 27 | −4057.03 |

Numerical Example 2 unit mm surface data

| Surface number | r | d | nd | vd |
|---|---|---|---|---|
| 1 | 51.233 | 3.32 | 1.48749 | 70.2 |
| 2 | 568.400 | 0.20 | | |
| 3 | 74.895 | 1.50 | 1.80610 | 40.9 |
| 4 | 33.107 | 4.65 | 1.48749 | 70.2 |
| 5 | −688.986 | (variable) | | |
| 6 | −196.425 | 0.90 | 1.72000 | 50.2 |
| 7 | 16.602 | 2.48 | 1.84666 | 23.9 |
| 8 | 37.983 | 2.25 | | |
| 9 | −30.704 | 0.90 | 1.77250 | 49.6 |
| 10 | 821.260 | (variable) | | |
| 11 | 23.333 | 3.55 | 1.66672 | 48.3 |
| 12 | −106.852 | 1.90 | | |
| 13 | 14.545 | 4.91 | 1.49700 | 81.5 |
| 14 | −155.636 | 0.80 | 1.84666 | 23.9 |
| 15 | 25.072 | 3.30 | | |
| 16(diaphragm) | ∞ | 2.70 | | |
| 17* | 98.001 | 2.20 | 1.58313 | 59.4 |
| 18* | 5000.000 | 3.50 | | |
| 19 | −74.327 | 1.50 | 1.80610 | 33.3 |
| 20 | −18.713 | 0.60 | 1.69350 | 53.2 |
| 21 | 25.530 | 3.00 | | |
| 22 | 18.069 | 2.61 | 1.48749 | 70.2 |
| 23 | −33.595 | (variable) | | |
| 24 | 206.259 | 0.60 | 1.69680 | 55.5 |
| 25 | 11.588 | 1.90 | 1.54072 | 47.2 |
| 26 | 28.358 | 13.34 | | |
| 27 | −32.336 | 3.24 | 1.76200 | 40.1 |
| 28 | −14.538 | 0.90 | 1.51633 | 64.1 |
| 29 | −74.423 | (variable) | | |
| 30 | ∞ | 1.70 | 1.54400 | 60.0 |
| 31 | ∞ | 1.60 | | |
| image plane | ∞ | | | | aspherical data

17th surface

K = 0.00000e+000   A 4 = −8.67657e−005   A 6 = 7.07999e−007
A 8 = 1.38044e−008   A10 = −1.43378e−010   A12 = 4.71377e−013

18th surface

K = 0.00000e+000   A 4 = 2.91715e−005   A 6 = 1.27287e−006
A 8 = 9.55264e−009 various data
zoom ratio 3.45

| | wide angle | middle | telephoto |
|---|---|---|---|
| focal length | 56.60 | 134.00 | 195.00 |
| F-number | 4.50 | 5.62 | 6.45 |
| half viewing angle (degree) | 13.57 | 5.82 | 4.01 |
| image height | 13.66 | 13.66 | 13.66 |
| total length | 103.39 | 130.62 | 146.39 |
| BF | 17.70 | 28.16 | 41.54 | interval when focus lens focuses on infinity

| | wide angle | middle | telephoto |
|---|---|---|---|
| focal length | 56.60 | 134.00 | 195.00 |
| d 5 | 1.26 | 25.98 | 33.69 |
| d10 | 15.40 | 4.15 | 0.80 |
| d23 | 2.00 | 4.50 | 2.00 |
| d26 | 13.62 | 14.42 | 14.95 |
| d29 | 15.00 | 25.46 | 38.84 | interval when focus lens focuses on distance of 4 m

| | wide angle | middle | telephoto |
|---|---|---|---|
| focal length | 56.60 | 134.00 | 195.00 |
| d 5 | 1.26 | 25.98 | 33.69 |
| d10 | 15.40 | 4.15 | 0.80 |
| d23 | 2.27 | 5.57 | 3.61 |
| d29 | 15.00 | 25.46 | 38.84 | unit mm zoom lens unit data

| unit | start surface | focal length |
|---|---|---|
| 1 | 1 | 94.34 |
| 2 | 6 | −22.06 |
| 3 | 11 | 26.00 |
| 4 | 24 | −34.07 |
| 5 | 27 | 752.77 |

Numerical Example 3 unit mm surface data

| Surface number | r | d | nd | vd |
|---|---|---|---|---|
| 1 | 49.288 | 2.72 | 1.48749 | 70.2 |
| 2 | 153.997 | 0.20 | | |
| 3 | 72.655 | 1.50 | 1.80610 | 40.9 |
| 4 | 32.511 | 5.24 | 1.48749 | 70.2 |
| 5 | −217.332 | (variable) | | |
| 6 | −115.214 | 0.90 | 1.72000 | 50.2 |
| 7 | 16.623 | 2.76 | 1.84666 | 23.9 |
| 8 | 41.956 | 2.01 | | |
| 9 | −36.630 | 0.90 | 1.77250 | 49.6 |
| 10 | 270.270 | (variable) | | |
| 11 | 21.200 | 3.70 | 1.66672 | 48.3 |
| 12 | −138.048 | 1.23 | | |
| 13 | 15.576 | 4.93 | 1.49700 | 81.5 |
| 14 | −78.185 | 0.90 | 1.84666 | 23.9 |
| 15 | 27.137 | 3.30 | | |
| 16(diaphragm) | ∞ | 2.70 | | |
| 17* | 98.001 | 2.20 | 1.58313 | 59.4 |
| 18* | 5000.000 | 3.50 | | |
| 19 | −72.058 | 1.47 | 1.80610 | 33.3 |
| 20 | −18.816 | 0.60 | 1.69350 | 53.2 |
| 21 | 25.574 | 3.00 | | |
| 22 | 17.937 | 2.73 | 1.48749 | 70.2 |
| 23 | −33.932 | 2.10 | | |
| 24 | 205.789 | 0.60 | 1.69680 | 55.5 |
| 25 | 11.034 | 2.00 | 1.54072 | 47.2 |
| 26 | 29.745 | (variable) | | |
| 27 | −32.721 | 3.35 | 1.76200 | 40.1 |
| 28 | −13.878 | 1.00 | 1.51633 | 64.1 |
| 29 | −119.227 | (variable) | | |
| 30 | ∞ | 1.70 | 1.54400 | 60.0 |
| 31 | ∞ | 1.41 | | |
| image plane | ∞ | | | | aspherical data

17th surface

K = 0.00000e+000   A 4 = −7.52783e−005   A 6 = 4.89909e−007
A 8 = 7.82710e−009   A10 = 4.08741e−011   A12 = −1.18013e−012

18th surface

K = 0.00000e+000   A 4 = 4.56560e−005   A 6 = 8.72676e−007
A 8 = 1.22417e−008 various data
zoom ratio 3.45

| | wide angle | middle | telephoto |
|---|---|---|---|
| focal length | 56.60 | 135.79 | 195.00 |
| F-number | 4.50 | 5.85 | 6.45 |
| half viewing angle (degree) | 13.57 | 5.74 | 4.01 |
| image height | 13.66 | 13.66 | 13.66 |
| total length | 103.39 | 135.02 | 145.39 |
| BF | 24.51 | 32.99 | 40.50 |
| d 5 | 1.30 | 27.24 | 35.25 |

-continued unit mm

| | | | |
|---|---|---|---|
| d10 | 15.76 | 5.73 | 0.80 |
| d26 | 6.28 | 13.51 | 13.30 |
| d29 | 22.00 | 30.48 | 37.98 | zoom lens unit data

| unit | start surface | focal length |
|---|---|---|
| 1 | 1 | 97.11 |
| 2 | 6 | −22.86 |
| 3 | 11 | −26.05 |
| 4 | 24 | −34.30 |
| 5 | 27 | −3779.16 |

Numerical Example 4 unit mm surface data

| Surface number | r | d | nd | νd |
|---|---|---|---|---|
| 1 | 68.233 | 2.87 | 1.49700 | 81.5 |
| 2 | 167.242 | 0.20 | | |
| 3 | 78.044 | 1.50 | 1.83481 | 42.7 |
| 4 | 43.207 | 6.20 | 1.49700 | 81.5 |
| 5 | −354.013 | (variable) | | |
| 6 | −239.680 | 0.90 | 1.80400 | 46.6 |
| 7 | 20.369 | 2.70 | 1.92286 | 18.9 |
| 8 | 40.942 | 2.35 | | |
| 9 | −30.294 | 0.90 | 1.88300 | 40.8 |
| 10 | −153.408 | (variable) | | |
| 11* | 25.748 | 2.95 | 1.73077 | 40.5 |
| 12 | −1099.756 | 6.80 | | |
| 13 | 16.687 | 5.00 | 1.49700 | 81.5 |
| 14 | −41.672 | 0.90 | 1.84666 | 23.9 |
| 15 | 34.913 | 2.90 | | |
| 16(diaphragm) | ∞ | 3.10 | | |
| 17* | 66.324 | 1.75 | 1.58313 | 59.4 |
| 18* | −96.587 | 3.50 | | |
| 19 | −61.262 | 1.80 | 1.80610 | 33.3 |
| 20 | −18.771 | 0.60 | 1.69350 | 53.2 |
| 21 | 34.899 | 5.38 | | |
| 22 | 25.498 | 2.63 | 1.48749 | 70.2 |
| 23 | −25.661 | (variable) | | |
| 24 | 274.578 | 0.60 | 1.59522 | 67.7 |
| 25 | 16.885 | 1.14 | 1.80000 | 29.8 |
| 26 | 19.063 | 16.04 | | |
| 27 | −37.712 | 2.91 | 1.70154 | 41.2 |
| 28 | −14.184 | 1.00 | 1.59522 | 67.7 |
| 29 | −64.449 | (variable) | | |
| 30 | ∞ | 1.70 | 1.54400 | 60.0 |
| 31 | ∞ | 1.94 | | |
| image plane | ∞ | | | | aspherical data

11th surface

K = 0.00000e+000   A 4 = 1.67355e−006   A 6 = 5.18302e−009
A 8 = −5.81024e−012

17th surface

K = 0.00000e+000   A 4 = −7.70609e−005   A 6 = 3.71235e−007
A 8 = 6.24668e−009   A10 = 3.25717e−011   A12 = −3.83900e−013

18th surface

K = 0.00000e+000   A 4 = 9.54832e−007   A 6 = 5.46359e−007
A 8 = 7.60292e−009

-continued unit mm various data
zoom ratio 4.36

| | wide angle | middle | telephoto |
|---|---|---|---|
| focal length | 56.14 | 134.30 | 245.00 |
| F-number | 4.50 | 5.09 | 6.45 |
| half viewing angle (degree) | 13.67 | 5.81 | 3.19 |
| image height | 13.66 | 13.66 | 13.66 |
| total length | 119.39 | 157.52 | 184.41 |
| BF | 22.04 | 27.75 | 50.36 |
| d 5 | 1.10 | 41.69 | 54.52 |
| d10 | 16.56 | 5.97 | 0.80 |
| d23 | 3.07 | 5.48 | 2.10 |
| d29 | 19.00 | 24.71 | 47.32 | zoom lens unit data

| unit | start surface | focal length |
|---|---|---|
| 1 | 1 | 116.17 |
| 2 | 6 | −22.56 |
| 3 | 11 | 32.17 |
| 4 | 24 | −36.67 |
| 5 | 27 | −783.89 |

Numerical Example 5 unit mm surface data

| Surface number | r | d | nd | νd |
|---|---|---|---|---|
| 1 | 47.999 | 3.00 | 1.51633 | 64.1 |
| 2 | 199.205 | 0.20 | | |
| 3 | 79.213 | 1.50 | 1.80400 | 46.6 |
| 4 | 32.093 | 5.20 | 1.49700 | 81.5 |
| 5 | −264.415 | (variable) | | |
| 6 | −114.148 | 0.90 | 1.71300 | 53.9 |
| 7 | 17.305 | 2.70 | 1.84666 | 23.8 |
| 8 | 45.783 | 2.21 | | |
| 9 | −37.834 | 0.90 | 1.83400 | 37.2 |
| 10 | 207.695 | (variable) | | |
| 11 | 22.376 | 3.60 | 1.80610 | 33.3 |
| 12 | −1211.448 | 1.90 | | |
| 13 | 15.765 | 5.00 | 1.49700 | 81.5 |
| 14 | −118.529 | 0.90 | 1.92286 | 18.9 |
| 15 | 24.712 | 2.90 | | |
| 16(diaphragm) | ∞ | 3.10 | | |
| 17* | 81.614 | 2.20 | 1.85400 | 40.4 |
| 18* | 5000.000 | 3.50 | | |
| 19 | −1110.863 | 0.60 | 1.91082 | 35.3 |
| 20 | 15.810 | 1.70 | 1.92286 | 18.9 |
| 21 | 28.812 | 3.00 | | |
| 22 | 18.361 | 2.80 | 1.49700 | 81.5 |
| 23 | −32.586 | (variable) | | |
| 24 | 27.025 | 2.00 | 1.80809 | 22.8 |
| 25 | −44.006 | 0.60 | 2.00330 | 28.3 |
| 26 | 17.052 | 11.54 | | |
| 27 | −22.892 | 3.30 | 2.00100 | 29.1 |
| 28 | −13.107 | 1.00 | 1.60311 | 60.6 |
| 29 | −63.930 | (variable) | | |
| 30 | ∞ | 1.70 | 1.54400 | 60.0 |
| 31 | ∞ | 1.60 | | |
| image plane | ∞ | | | |

-continued

| unit mm |
|---| aspherical data

17th surface

K = 0.00000e+000   A 4 = −6.58448e−005   A 6 = 4.20856e−007
A 8 = 8.60004e−009   A10 = 3.74105e−012   A12 = −5.30209e−013

18th surface

K = 0.00000e+000   A 4 = 7.52431e−006   A 6 = 6.99599e−007
A 8 = 1.00569e−008 various data
zoom ratio 3.45

| | wide angle | middle | telephoto |
|---|---|---|---|
| focal length | 56.60 | 136.00 | 195.00 |
| F-number | 4.44 | 5.73 | 6.45 |
| half viewing angle (degree) | 13.57 | 5.74 | 4.01 |
| image height | 13.66 | 13.66 | 13.66 |
| total length | 103.39 | 132.71 | 143.37 |
| BF | 17.70 | 32.64 | 41.48 |
| d 5 | 1.36 | 25.98 | 32.73 |
| d10 | 16.08 | 5.54 | 0.80 |
| d23 | 2.00 | 2.29 | 2.10 |
| d29 | 15.00 | 29.95 | 38.78 | zoom lens unit data

| unit | start surface | focal length |
|---|---|---|
| 1 | 1 | 93.59 |
| 2 | 6 | −22.65 |
| 3 | 11 | 26.44 |
| 4 | 24 | −32.44 |
| 5 | 27 | −1000.00 |

Numerical Example 6

| unit mm |
|---| surface data

| Surface number | r | d | nd | vd |
|---|---|---|---|---|
| 1 | 47.892 | 3.00 | 1.48749 | 70.2 |
| 2 | 194.405 | 0.20 | | |
| 3 | 71.819 | 1.50 | 1.80610 | 40.9 |
| 4 | 32.118 | 5.20 | 1.48749 | 70.2 |
| 5 | −273.637 | (variable) | | |
| 6 | −117.859 | 0.90 | 1.72000 | 50.2 |
| 7 | 16.693 | 2.70 | 1.84666 | 23.9 |
| 8 | 40.553 | 2.08 | | |
| 9 | −32.797 | 0.90 | 1.77250 | 49.6 |
| 10 | 321.397 | (variable) | | |
| 11 | 21.917 | 3.60 | 1.66672 | 48.3 |
| 12 | −137.271 | 1.90 | | |
| 13 | 15.585 | 5.00 | 1.49700 | 81.5 |
| 14 | −73.772 | 0.90 | 1.84666 | 23.9 |
| 15 | 30.304 | 2.90 | | |
| 16(diaphragm) | ∞ | 3.10 | | |
| 17* | 89.177 | 2.20 | 1.58313 | −59.4 |
| 18* | 5000.000 | 3.50 | | |
| 19 | −77.256 | 1.50 | 1.80610 | 33.3 |
| 20 | −18.820 | 0.60 | 1.69350 | 53.2 |
| 21 | 24.634 | 3.00 | | |
| 22 | 17.658 | 2.80 | 1.48749 | 70.2 |
| 23 | −34.750 | (variable) | | |
| 24 | 289.119 | 0.60 | 1.69680 | −55.5 |
| 25 | 11.213 | 2.00 | 1.54072 | 47.2 |
| 26 | 29.096 | 12.89 | | |
| 27 | −28.990 | 3.30 | 1.76200 | 40.1 |
| 28 | −13.622 | 1.00 | 1.51633 | 64.1 |
| 29 | −63.329 | (variable) | | |
| 30 | ∞ | 1.70 | 1.54400 | 60.0 |
| 31 | ∞ | 1.60 | | |
| image plane | ∞ | | | | aspherical data

17th surface

K = 0.00000e+000   A 4 = −8.81267e−005   A 6 = 6.56231e−007
A 8 = 8.85959e−009   A10 = −5.44212e−011   A12 = −1.28510e−013

18th surface

K = 0.00000e+000   A 4 = 2.90566e−005   A 6 = 1.12847e−006
A 8 = 8.62328e−009 various data
zoom ratio 3.45

| | wide angle | middle | telephoto |
|---|---|---|---|
| focal length | 56.60 | 134.14 | 195.00 |
| F-number | 4.50 | 5.64 | 6.45 |
| half viewing angle (degree) | 13.57 | 5.81 | 4.01 |
| image height | 13.66 | 13.66 | 13.66 |
| total length | 103.39 | 130.72 | 145.39 |
| BF | 17.70 | 28.68 | 41.48 |
| d 5 | 1.35 | 26.25 | 33.75 |
| d10 | 15.08 | 4.27 | 0.80 |
| d23 | 2.00 | 4.25 | 2.10 |
| d29 | 15.00 | 25.98 | 38.78 | zoom lens unit data

| unit | start surface | focal length |
|---|---|---|
| 1 | 1 | 92.51 |
| 2 | 6 | −21.51 |
| 3 | 11 | 25.76 |
| 4 | 24 | −32.96 |
| 5 | 27 | 812.18 |

Numerical Example 7

| unit mm |
|---| surface data

| Surface number | r | d | nd | vd |
|---|---|---|---|---|
| 1 | 47.660 | 3.00 | 1.48749 | 70.2 |
| 2 | 188.708 | 0.20 | | |
| 3 | 72.506 | 1.50 | 1.80610 | 40.9 |
| 4 | 32.025 | 5.20 | 1.48749 | 70.2 |
| 5 | −270.270 | (variable) | | |
| 6 | −109.712 | 0.90 | 1.72000 | 50.2 |
| 7 | 16.846 | 2.70 | 1.84666 | 23.9 |

-continued

| | | unit mm | | |
|---|---|---|---|---|
| 8 | 41.801 | 2.01 | | |
| 9 | −34.698 | 0.90 | 1.77250 | 49.6 |
| 10 | 270.270 | (variable) | | |
| 11 | 21.784 | 3.60 | 1.66672 | 48.3 |
| 12 | −143.935 | 1.90 | | |
| 13 | 16.083 | 5.00 | 1.49700 | 81.5 |
| 14 | −64.857 | 0.90 | 1.84666 | 23.9 |
| 15 | 32.288 | 2.90 | | |
| 16(diaphragm) | ∞ | 3.10 | | |
| 17* | 98.001 | 2.20 | 1.58313 | 59.4 |
| 18* | 5000.000 | 3.50 | | |
| 19 | −74.161 | 1.50 | 1.80610 | 33.3 |
| 20 | −18.536 | 0.60 | 1.69350 | 53.2 |
| 21 | 24.920 | 3.00 | | |
| 22 | 17.981 | 2.80 | 1.48749 | 70.2 |
| 23 | −33.066 | (variable) | | |
| 24 | 198.088 | 0.60 | 1.69680 | 55.5 |
| 25 | 11.153 | 2.00 | 1.54072 | 47.2 |
| 26 | 28.573 | (variable) | | |
| 27 | −31.484 | 3.30 | 1.76200 | 40.1 |
| 28 | −13.923 | 1.00 | 1.51633 | 64.1 |
| 29 | −96.129 | (variable) | | |
| 30 | ∞ | 1.70 | 1.51633 | 64.1 |
| 31 | ∞ | 1.58 | | |
| image plane | ∞ | | | | aspherical data

17$^{th}$ surface

K = 0.00000e+000　　A 4 = −7.13224e−005　　A 6 = 6.85506e−007　　A 8 = 4.86537e−009
A10 = −1.02887e−011　　A12 = −4.62516e−013
18$^{th}$ surface K = 0.00000e+000　　A 4 = 4.42819e−005　　A 6 = 1.10071e−006　　A 8 = 6.30046e−009 various data
zoom ratio 3.45

| | wide angle | middle | telephoto |
|---|---|---|---|
| focal length | 56.60 | 134.49 | 195.00 |
| F-number | 4.50 | 5.74 | 6.45 |
| half viewing angle (degree) | 13.57 | 5.80 | 4.01 |
| image height | 13.66 | 13.66 | 13.66 |
| total length | 103.39 | 129.94 | 144.52 |
| BF | 17.70 | 28.49 | 39.30 |
| d 5 | 1.39 | 25.96 | 34.17 |
| d10 | 15.39 | 4.02 | 0.80 |
| d23 | 2.00 | 4.77 | 2.10 |
| d26 | 12.60 | 12.39 | 13.84 |
| d29 | 15.00 | 25.79 | 36.60 | zoom lens unit data

| unit | start surface | focal length |
|---|---|---|
| 1 | 1 | 93.68 |
| 2 | 6 | −21.97 |
| 3 | 11 | 26.03 |
| 4 | 24 | −33.77 |
| 5 | 27 | −8133.88 |

Numerical Example 8

| | unit mm | | | |
|---|---|---|---|---|
| | surface data | | | |
| Surface number | r | d | nd | vd |
| 1 | 50.649 | 3.00 | 1.48749 | 70.2 |
| 2 | 161.693 | 0.20 | | |

-continued

| unit mm | | | | |
|---|---|---|---|---|
| 3 | 73.065 | 1.50 | 1.80610 | 40.9 |
| 4 | 33.142 | 5.20 | 1.48749 | 70.2 |
| 5 | −238.770 | (variable) | | |
| 6 | −84.105 | 0.90 | 1.72000 | 50.2 |
| 7 | 17.890 | 2.70 | 1.84666 | 23.9 |
| 8 | 51.604 | 1.57 | | |
| 9 | −57.183 | 0.90 | 1.88300 | 40.8 |
| 10 | 198.370 | (variable) | | |
| 11 | 21.412 | 3.60 | 1.66672 | 48.3 |
| 12 | −376.397 | 1.90 | | |
| 13 | 16.155 | 5.00 | 1.49700 | 81.5 |
| 14 | −94.067 | 0.90 | 1.84666 | 23.9 |
| 15 | 27.936 | 2.90 | | |
| 16(diaphragm) | ∞ | 3.10 | | |
| 17* | 126.105 | 2.20 | 1.58313 | 59.4 |
| 18* | 5000.000 | 3.50 | | |
| 19 | −66.878 | 1.50 | 1.80610 | 33.3 |
| 20 | −18.090 | 0.60 | 1.69350 | 53.2 |
| 21 | 24.983 | 3.04 | | |
| 22 | 17.878 | 2.80 | 1.48749 | 70.2 |
| 23 | −31.416 | (variable) | | |
| 24 | 3100.554 | 0.60 | 1.69680 | 55.5 |
| 25 | 11.657 | 2.00 | 1.54072 | 47.2 |
| 26 | 33.940 | (variable) | | |
| 27 | −34.985 | 3.30 | 1.76200 | 40.1 |
| 28 | −14.261 | 1.00 | 1.51633 | 64.1 |
| 29 | −188.963 | (variable) | | |
| 30 | ∞ | 0.50 | 1.51633 | 64.1 |
| 31 | ∞ | 2.37 | | |
| image plane | ∞ | | | | aspherical data $17^{th}$ surface

K = 0.00000e+000  A 4 = −7.25041e−006  A 6 = 7.89743e−007  A 8 = 1.06878e−008
A10 = −2.39056e−010  A12 = 1.46728e−012

$18^{th}$ surface

K = 0.00000e+000  A 4 = 1.09767e−004  A 6 = 1.39920e−006  A 8 = 5.51587e−009 various data
zoom ratio 3.45

| | wide angle | middle | telephoto |
|---|---|---|---|
| focal length | 56.60 | 136.00 | 195.00 |
| F-number | 4.50 | 5.93 | 6.45 |
| half viewing angle (degree) | 13.57 | 5.74 | 4.01 |
| image height | 13.66 | 13.66 | 13.66 |
| total length | 109.39 | 134.66 | 143.58 |
| BF | 23.99 | 32.02 | 38.68 |
| d 5 | 1.56 | 26.82 | 35.74 |
| d10 | 20.96 | 6.73 | 0.80 |
| d23 | 2.00 | 2.98 | 2.10 |
| d26 | 6.98 | 12.20 | 12.35 |
| d29 | 21.29 | 29.32 | 35.98 | zoom lens unit data

| unit | start surface | focal length |
|---|---|---|
| 1 | 1 | 98.92 |
| 2 | 6 | −25.89 |
| 3 | 11 | 28.27 |
| 4 | 24 | −34.05 |
| 5 | 27 | −1000.00 |

Numerical Example 9

| unit mm | | | | |
|---|---|---|---|---|
| surface data | | | | |
| Surface number | r | d | nd | vd |
| 1 | 68.432 | 3.06 | 1.49700 | 81.5 |
| 2 | 168.040 | 0.20 | | |
| 3 | 78.052 | 1.50 | 1.83481 | 42.7 |
| 4 | 43.199 | 6.58 | 1.49700 | 81.5 |
| 5 | −361.938 | (variable) | | |
| 6 | −193.489 | 0.90 | 1.80400 | 46.6 |
| 7 | 19.964 | 2.70 | 1.92286 | 18.9 |
| 8 | 40.752 | 2.26 | | |
| 9 | −30.120 | 0.90 | 1.88300 | 40.8 |
| 10 | −129.085 | (variable) | | |
| 11* | 26.148 | 2.81 | 1.73077 | 40.5 |
| 12 | −1721.110 | 7.13 | | |
| 13 | 16.672 | 5.00 | 1.49700 | 81.5 |
| 14 | −40.477 | 0.90 | 1.84666 | 23.9 |
| 15 | 34.745 | 2.90 | | |
| 16(diaphragm) | ∞ | 3.10 | | |
| 17* | 61.848 | 1.62 | 1.58313 | 59.4 |
| 18* | −90.700 | 3.50 | | |
| 19 | −57.844 | 1.81 | 1.80610 | 33.3 |
| 20 | −17.841 | 0.60 | 1.69350 | 53.2 |
| 21 | 34.829 | 5.14 | | |
| 22 | 25.894 | 2.65 | 1.48749 | 70.2 |
| 23 | −24.704 | (variable) | | |
| 24 | 195.568 | 0.60 | 1.59522 | 67.7 |
| 25 | 16.216 | 1.13 | 1.80000 | 29.8 |
| 26 | 18.168 | (variable) | | |
| 27 | −39.688 | 3.08 | 1.70154 | 41.2 |
| 28 | −14.057 | 1.00 | 1.59522 | 67.7 |
| 29 | −69.193 | (variable) | | |
| 30 | ∞ | 1.70 | 1.51633 | 64.1 |
| 31 | ∞ | 1.45 | | |
| image plane | ∞ | | | | aspherical data $11^{th}$ surface

K = 0.00000e+000   A 4 = 2.04336e−006   A 6 = 4.24691e−009   A 8 = 4.27758e−012

$17^{th}$ surface

K = 0.00000e+000   A 4 = −7.77587e−005   A 6 = 3.76104e−007   A 8 = 6.75240e−009
A10 = 3.556126−011   A12 = −4.05035e−013

$18^{th}$ surface

K = 0.00000e+000   A 4 = −4.21165e−007   A 6 = 5.40618e−007   A 8 = 8.15067e−009 various data
zoom ratio 4.45

| | wide angle | middle | telephoto |
|---|---|---|---|
| focal length | 55.00 | 134.00 | 245.00 |
| F-number | 4.50 | 5.29 | 6.45 |
| half viewing angle (degree) | 13.95 | 5.82 | 3.19 |
| image height | 13.66 | 13.66 | 13.66 |
| total length | 119.39 | 156.58 | 184.41 |
| BF | 20.57 | 23.72 | 41.97 |
| d 5 | 1.17 | 41.84 | 55.87 |
| d10 | 16.60 | 4.99 | 0.88 |
| d23 | 3.96 | 7.23 | 2.10 |
| d26 | 16.03 | 17.73 | 22.53 |
| d29 | 18.00 | 21.16 | 39.41 | zoom lens unit data

| unit | start surface | focal length |
|---|---|---|
| 1 | 1 | 116.75 |
| 2 | 6 | −22.64 |

| | | |
|---|---|---|
| 3 | 11 | 32.14 |
| 4 | 24 | −35.85 |
| 5 | 27 | −1062.37 |

Numerical Example 10 unit mm surface data

| Surface number | r | d | nd | vd |
|---|---|---|---|---|
| 1 | 48.449 | 3.00 | 1.48749 | 70.2 |
| 2 | 194.057 | 0.20 | | |
| 3 | 71.209 | 1.50 | 1.80610 | 40.9 |
| 4 | 32.196 | 5.20 | 1.48749 | 70.2 |
| 5 | −273.014 | (variable) | | |
| 6 | −118.507 | 0.90 | 1.72000 | 50.2 |
| 7 | 16.603 | 2.70 | 1.84666 | 23.9 |
| 8 | 39.801 | 2.10 | | |
| 9 | −32.865 | 0.90 | 1.77250 | 49.6 |
| 10 | 429.045 | (variable) | | |
| 11 | 22.043 | 3.60 | 1.66672 | 48.3 |
| 12 | −137.318 | 1.90 | | |
| 13 | 15.514 | 5.00 | 1.49700 | 81.5 |
| 14 | −80.473 | 0.90 | 1.84666 | 23.9 |
| 15 | 29.212 | 2.90 | | |
| 16(diaphragm) | ∞ | 3.10 | | |
| 17* | 84.225 | 2.20 | 1.58313 | 59.4 |
| 18* | 5000.000 | 3.50 | | |
| 19 | −78.604 | 1.50 | 1.80610 | 33.3 |
| 20 | −19.127 | 0.60 | 1.69350 | 53.2 |
| 21 | 24.562 | 3.00 | | |
| 22 | 17.392 | 2.80 | 1.48749 | 70.2 |
| 23 | −36.787 | (variable) | | |
| 24 | 184.362 | 0.60 | 1.69680 | 55.5 |
| 25 | 10.993 | 2.00 | 1.54072 | 47.2 |
| 26 | 26.744 | (variable) | | |
| 27 | −33.231 | 3.30 | 1.76200 | 40.1 |
| 28 | −14.064 | 1.00 | 1.51633 | 64.1 |
| 29 | −81.157 | (variable) | | |
| 30 | ∞ | 0.50 | 1.51633 | 64.1 |
| 31 | ∞ | 2.38 | | |
| image plane | ∞ | | | | aspherical data $17^{th}$ surface

K = 0.00000e+000  A 4 = −8.95530e−005  A 6 = 6.14264e−007  A 8 = 8.75879e−009
A10 = −3.07650e−011  A12 = −3.61424e−013

$18^{th}$ surface

K = 0.00000e+000  A 4 = 2.59433e−005  A 6 = 1.07052e−006  A 8 = 9.31270e−009 various data
zoom ratio 3.52

| | wide angle | middle | telephoto |
|---|---|---|---|
| focal length | 55.47 | 136.00 | 195.00 |
| F-number | 4.50 | 5.66 | 6.45 |
| half viewing angle (degree) | 13.83 | 5.74 | 4.01 |
| image height | 13.66 | 13.66 | 13.66 |
| total length | 103.39 | 130.74 | 145.39 |
| BF | 18.32 | 28.75 | 39.53 |
| d 5 | 1.35 | 26.59 | 33.72 |
| d10 | 15.58 | 3.94 | 0.80 |
| d23 | 2.00 | 4.59 | 2.10 |
| d26 | 11.75 | 12.46 | 14.84 |
| d29 | 15.62 | 26.04 | 36.82 |

-continued

| unit mm | | |
|---|---|---|
| zoom lens unit data | | |
| unit | start surface | focal length |
| 1 | 1 | 92.51 |
| 2 | 6 | −21.68 |
| 3 | 11 | 25.83 |
| 4 | 24 | −32.40 |
| 5 | 27 | 514.59 |

TABLE 1

Values corresponding to conditional expressions in Embodiments 1 to 5

| | | Embodiment 1 | Embodiment 2 | Embodiment 3 | Embodiment 4 | Embodiment 5 |
|---|---|---|---|---|---|---|
| Eq. (1) | Lfsk/Lf | 1.906 | 1.874 | 2.852 | 2.016 | 1.960 |
| Eq. (2) | f2/fn | 0.620 | 0.575 | 0.644 | 0.635 | 0.678 |
| Eq. (3) | \|fi/ff\| | 119.585 | 22.098 | 110.170 | 21.376 | 30.828 |
| Eq. (4) | f1/\|fn\| | 2.646 | 2.460 | 2.735 | 3.271 | 2.803 |
| Eq. (5) | Tl/ft | 0.742 | 0.751 | 0.746 | 0.753 | 0.735 |
| Eq. (6) | \|f2\|/fw | 0.387 | 0.390 | 0.404 | 0.402 | 0.400 |
| Eq. (7) | \|ff\|/Wsk | 1.917 | 1.925 | 1.399 | 1.664 | 1.833 |
| Eq. (8) | f3/\|fn\| | 0.736 | 0.678 | 0.734 | 0.906 | 0.792 |
| Eq. (9) | f2/ft | 0.112 | 0.113 | 0.117 | 0.092 | 0.116 |
| Eq. (10) | f2/f4 | 0.646 | 0.648 | 0.666 | 0.615 | 0.698 |
| Eq. (11) | ft/f1 | 2.085 | 2.067 | 2.008 | 2.109 | 2.084 |
| Eq. (12) | ft/\|f2\| | 8.904 | 8.840 | 8.531 | 10.858 | 8.611 |
| Eq. (13) | ft/\|f4\| | 5.748 | 5.724 | 5.685 | 6.681 | 6.011 |
| Eq. (14) | f1/\|f4\| | 2.757 | 2.769 | 2.831 | 3.168 | 2.885 |

TABLE 2

Values corresponding to conditional expressions in Embodiments 6 to 10

| | | Embodiment 6 | Embodiment 7 | Embodiment 8 | Embodiment 9 | Embodiment 10 |
|---|---|---|---|---|---|---|
| Eq. (1) | Lfsk/Lf | 1.894 | 1.908 | 2.729 | 1.942 | 1.983 |
| Eq. (2) | f2/fn | 0.580 | 0.624 | 0.762 | 0.640 | 0.579 |
| Eq. (3) | \|fi/ff\| | 24.644 | 240.893 | 29.366 | 29.632 | 15.882 |
| Eq. (4) | f1/\|fn\| | 2.495 | 2.661 | 2.912 | 3.302 | 2.469 |
| Eq. (5) | Tl/ft | 0.746 | 0.741 | 0.736 | 0.753 | 0.746 |
| Eq. (6) | \|f2\|/fw | 0.380 | 0.388 | 0.457 | 0.412 | 0.391 |
| Eq. (7) | \|ff\|/Wsk | 1.862 | 1.908 | 1.419 | 1.743 | 1.768 |
| Eq. (8) | f3/\|fn\| | 0.695 | 0.739 | 0.832 | 0.909 | 0.689 |
| Eq. (9) | f2/ft | 0.110 | 0.113 | 0.133 | 0.092 | 0.111 |
| Eq. (10) | f2/f4 | 0.653 | 0.651 | 0.760 | 0.631 | 0.669 |
| Eq. (11) | ft/f1 | 2.108 | 2.081 | 1.971 | 2.099 | 2.108 |
| Eq. (12) | ft/\|f2\| | 9.064 | 8.877 | 7.531 | 10.824 | 8.995 |
| Eq. (13) | ft/\|f4\| | 5.917 | 5.775 | 5.726 | 6.834 | 6.018 |
| Eq. (14) | f1/\|f4\| | 2.807 | 2.775 | 2.905 | 3.256 | 2.855 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-050186, filed Mar. 13, 2013, and Japanese Patent Application No. 2014-004581, filed Jan. 14, 2014, which are hereby incorporated by reference herein in their entirety.

What is claimed is:

1. A zoom lens comprising:
a first lens unit having a positive refractive power;
a second lens unit having a negative refractive power;
a third lens unit having a positive refractive power; and
a rear unit having two or more lens units, in the order from an object side to an image side, an interval between the adjacent lens units being changed in order to carry out at least one of zooming and focusing,
wherein the rear unit includes a focus lens unit that has a negative refractive power and that moves during the focusing,
wherein, when the zoom lens focuses on a specific object distance, the focus lens unit moves integrally with the other lens units during zooming, and
wherein the zoom lens satisfies a conditional expression of $$0.3 < f2/fn < 1.0$$

when a focal length of the second lens unit is defined as f2, and a combined focal length of the rear unit on the wide angle end is defined as fn.

2. The zoom lens according to claim 1, wherein the zoom lens satisfies a conditional expression of $$1.4 < Lfsk/Lf < 4.0$$

when a distance on an optical axis from a surface of a lens closest to the object side in the focus lens unit to an image plane on a wide angle end is defined as Lfsk, and a distance on the optical axis from a surface of a lens closest to the object side in the focus lens unit to a surface of a lens closest to the image side in the zoom lens on a wide angle end is defined as Lf.

3. The zoom lens according to claim 1, wherein the first lens unit to the third lens unit move to the object side during the zooming from the wide angle end to a telephoto end.

4. The zoom lens according to claim 1, wherein the rear unit includes, in the order from the object side to the image side, a fourth lens unit having a negative refractive power, and a fifth lens unit having a positive or negative refractive power.

5. The zoom lens according to claim 1, wherein the zoom lens satisfies a conditional expression of $$15.0 < |fi/ff| < 250.0$$

when a focal length of the focus lens unit is defined as ff, and a combined focal length of the lens units arranged closer to the image side than the focus lens unit on the wide angle end is defined as fi.

6. The zoom lens according to claim 1, wherein the zoom lens satisfies a conditional expression of $$1.5 < f1/|fn| < 5.0$$

when a focal length of the first lens unit is defined as f1.

7. The zoom lens according to claim 1, wherein the zoom lens satisfies a conditional expression of $$0.6 < T1/ft < 0.8$$

when a total length of the zoom lens on the telephoto end is defined as T1, and a focal length of the zoom lens on the telephoto end is defined as ft.

8. The zoom lens according to claim 1, wherein the zoom lens satisfies a conditional expression of $$0.1 < |f2|/fw < 1.0$$

when the focal length of the zoom lens on the wide angle end is defined as fw.

9. The zoom lens according to claim 1, wherein the zoom lens satisfies a conditional expression of $$0.8 < |ff|/Wsk < 3.0$$

when the focal length of the focus lens unit is defined as ff, and a back focus on the wide angle end is defined as Wsk.

10. The zoom lens according to claim 1, wherein the zoom lens satisfies a conditional expression of $$0.3 < f3/|fn| < 1.5$$

when the focal length of the third lens unit is defined as f3.

11. The zoom lens according to claim 1, wherein the zoom lens satisfies a conditional expression of $$0.05 < |f2|/ft < 0.20$$

when the focal length of the zoom lens on the telephoto end is defined as ft.

12. The zoom lens according to claim 1, wherein the rear unit includes, in the order from the object side to the image side, a fourth lens unit having a negative refractive power, and a fifth lens unit having a positive or negative refractive power, the fourth lens unit moving to perform focusing, wherein
the fourth lens unit moves integral with the third lens unit or the fifth lens unit during the zooming for focusing on infinity.

13. The zoom lens according to claim 1, wherein the rear unit includes, in the order from the object side to the image side, a fourth lens unit having a negative refractive power, and a fifth lens unit having a positive or negative refractive power, the fourth lens unit moving to perform focusing, wherein
the fourth lens unit moves integral with the third lens unit or the fifth lens unit during the zooming for focusing on a finite distance.

14. The zoom lens according to claim 1, wherein the zoom lens satisfies a conditional expression of $$1.0 < ft/f1 < 3.5$$

when the focal length of the first lens unit is defined as f1, and the focal length of the zoom lens on the telephoto end is defined as ft.

15. The zoom lens according to claim 1, wherein the zoom lens satisfies a conditional expression of $$6.0 < ft/|f2| < 12.0$$

when the focal length of the zoom lens on the telephoto end is defined as ft.

16. The zoom lens according to claim 1, wherein the zoom lens satisfies a conditional expression of $$5.0 < ft/|f4| < 7.5$$

when the focal length of the fourth lens unit is defined as f4, and the focal length of the zoom lens on the telephoto end is defined as ft.

17. The zoom lens according to claim 1, wherein the zoom lens satisfies a conditional expression of $$1.5 < f1/|f4| < 4.0$$

when the focal length of the fourth lens unit is defined as f4, and the focal length of the first lens unit is defined as f1.

18. A zoom lens comprising:
a first lens unit having a positive refractive power;
a second lens unit having a negative refractive power;
a third lens unit having a positive refractive power;
a fourth lens unit having a negative refractive power; and
a fifth lens unit having a negative or positive refractive power, in the order from an object side to an image side, wherein at least the first lens unit, the third lens unit, the fourth lens unit, and the fifth lens unit move during zooming, and the fourth lens unit performs focusing, the zoom lens satisfying conditional expressions of:

$$0.55 < f2 /f4 < 0.8,$$

$$0.6 < T1 /ft < 0.8, \text{ and}$$

$$6.0 < ft/|f2| < 12.0$$

when a focal length of the second lens unit is defined as f2, a focal length of the fourth lens unit is defined as f4, the focal length of the zoom lens on a telephoto end is defined as ft, and a distance from the lens closest to the object side on the telephoto end to an image plane is defined as T1.

19. The zoom lens according to claim 18, wherein the zoom lens satisfies a conditional expression of $1.0 < ft/f1 < 3.5$ when the focal length of the first lens unit is defined as f1.

20. The zoom lens according to claim 18, wherein the zoom lens satisfies a conditional expression of $5.0 < ft/|f4| < 7.5$.

21. The zoom lens according to claim 18, wherein the zoom lens satisfies a conditional expression of $1.5 < f1/|f4| < 4.0$ when the focal length of the first lens unit is defined as f1.

22. An image pickup device comprising:
a zoom lens; and
an image pickup element that receives an image formed by the zoom lens,
wherein the zoom lens comprises:
  a first lens unit having a positive refractive power;
  a second lens unit having a negative refractive power;
  a third lens unit having a positive refractive power; and
  a rear unit having two or more lens units, in the order from an object side to an image side, an interval between the adjacent lens units being changed in order to carry out at least one of zooming and focusing,
wherein the rear unit includes a focus lens unit that has a negative refractive power and that moves during the focusing, and
wherein, when the zoom lens focuses on a specific object distance, the focus lens unit moves integrally with the other lens units during zooming, and
wherein the zoom lens satisfies a conditional expression of $0.3 < f2/fn < 1.0$ when a focal length of the second lens unit is defined as f2, and a combined focal length of the rear unit on the wide angle end is defined as fn.

23. An image pickup device comprising:
a zoom lens; and
an image pickup element that receives an image formed by the zoom lens,
wherein the zoom lens comprises:
  a first lens unit having a positive refractive power;
  a second lens unit having a negative refractive power;
  a third lens unit having a positive refractive power;
  a fourth lens unit having a negative refractive power; and
  a fifth lens unit having a negative or positive refractive power, in the order from an object side to an image side, wherein at least the first lens unit, the third lens unit, the fourth lens unit, and the fifth lens unit move during zooming, and the fourth lens unit performs focusing,
the zoom lens satisfying conditional expressions of $0.55 < f2/f4 < 0.8$, $0.6 < T1/ft < 0.8$, and $6.0 < ft/|f2| < 12.0$ when a focal length of the second lens unit is defined as f2, a focal length of the fourth lens unit is defined as f4, the focal length of the zoom lens on a telephoto end is defined as ft, and a distance from the lens closest to the object side on the telephoto end to an image plane is defined as T1.

24. A zoom lens comprising:
a first lens unit having a positive refractive power;
a second lens unit having a negative refractive power;
a third lens unit having a positive refractive power; and
a rear unit having two or more lens units, in the order from an object side to an image side, an interval between the adjacent lens units being changed in order to carry out at least one of zooming and focusing,
wherein the rear unit includes a focus lens unit that has a negative refractive power and that moves during the focusing, and
wherein, when the zoom lens focuses on a specific object distance, the focus lens unit moves integrally with the other lens units during zooming,
wherein the zoom lens satisfies a conditional expression of $15.0 < |fi/ff| < 250.0$ when a focal length of the focus lens unit is defined as ff, and a combined focal length of the lens units arranged closer to the image side than the focus lens unit on the wide angle end is defined as fi.

25. A zoom lens comprising:
a first lens unit having a positive refractive power;
a second lens unit having a negative refractive power;
a third lens unit having a positive refractive power; and
a rear unit having two or more lens units, in the order from an object side to an image side, an interval between the adjacent lens units being changed in order to carry out at least one of zooming and focusing,
wherein the rear unit includes a focus lens unit that has a negative refractive power and that moves during the focusing, and
wherein, when the zoom lens focuses on a specific object distance, the focus lens unit moves integrally with the other lens units during zooming,
wherein the zoom lens satisfies a conditional expression of $0.6 < T1/ft < 0.8$ when a total length of the zoom lens on the telephoto end is defined as T1, and a focal length of the zoom lens on the telephoto end is defined as ft.

* * * * *